US010567044B2

(12) United States Patent
Fischer et al.

(10) Patent No.: US 10,567,044 B2
(45) Date of Patent: *Feb. 18, 2020

(54) UNIVERSAL REMOTE RADIO HEAD

(71) Applicant: CommScope Technologies LLC, Hickory, NC (US)

(72) Inventors: Larry G. Fischer, Waseca, MN (US); Philip M. Wala, Savage, MN (US); Dean Zavadsky, Shakopee, MN (US); Lance K. Uyehara, San Jose, CA (US); Jody Forland, St. Bonifacius, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,256

(22) Filed: Nov. 12, 2018

(65) Prior Publication Data

US 2019/0081662 A1 Mar. 14, 2019

Related U.S. Application Data

(63) Continuation of application No. 15/357,617, filed on Nov. 21, 2016, now Pat. No. 10,128,918, which is a
(Continued)

(51) Int. Cl.
*H04B 7/04* (2017.01)
*H04J 3/00* (2006.01)
(Continued)

(52) U.S. Cl.
CPC ............. *H04B 7/04* (2013.01); *H04B 7/0413* (2013.01); *H04H 20/79* (2013.01); *H04J 3/00* (2013.01);
(Continued)

(58) Field of Classification Search
CPC . H04L 41/5022; H04L 47/2408; H04L 47/32; H04L 41/509; H04L 47/30;
(Continued)

(56) References Cited

U.S. PATENT DOCUMENTS 4,183,054 A 1/1980 Patisaul et al.
4,451,916 A 5/1984 Casper et al.
(Continued)

FOREIGN PATENT DOCUMENTS

CA 2058736 A1 7/1993
CA 2058737 A1 7/1993
(Continued)

OTHER PUBLICATIONS

"DigivanceTM, Indoor Coverage Solution", "www.adc.com", 2001, pp. 1-8, Publisher: ADC.
(Continued)

*Primary Examiner* — Ayaz R Sheikh
*Assistant Examiner* — Debebe A Asefa
(74) *Attorney, Agent, or Firm* — Fogg & Powers LLC

(57) ABSTRACT

A distributed base station radio system includes a first radio head configured to: communicate first analog radio frequency signals in a first radio frequency band with a first subscriber unit; convert between the first analog radio frequency signals in the first radio frequency band and a first digital broadband signal through at least one of frequency conversion and analog to digital conversion; a first broadband to channelized conversion unit communicatively coupled to the first radio head and configured to communicate the first digital broadband signal with the first broadband to channelized conversion unit; wherein the first broadband to channelized conversion unit is further configured to: communicate the first digital broadband signal; convert between the first digital broadband signal and first digital
(Continued)

channelized data for the first radio frequency band; and communicate the first digital channelized data for the first radio frequency band with a first channelized radio frequency interface.

20 Claims, 19 Drawing Sheets

Related U.S. Application Data continuation of application No. 14/851,391, filed on Sep. 11, 2015, now Pat. No. 9,504,039, which is a continuation of application No. 14/187,135, filed on Feb. 21, 2014, now Pat. No. 9,178,636.

(60) Provisional application No. 61/768,038, filed on Feb. 22, 2013.

(51) Int. Cl.
*H04N 21/2385* (2011.01)
*H04H 20/79* (2008.01)
*H04W 88/08* (2009.01)
*H04B 7/0413* (2017.01)
*H04W 72/04* (2009.01)

(52) U.S. Cl.
CPC .... *H04N 21/2385* (2013.01); *H04W 72/0453* (2013.01); *H04W 88/085* (2013.01)

(58) Field of Classification Search
CPC ..... H04L 47/14; H04L 47/20; H04L 47/2416; H04L 47/2425; H04L 47/2441; H04N 21/64792; H04N 21/234327; H04N 21/2381; H04N 21/8451
See application file for complete search history.

(56) References Cited

U.S. PATENT DOCUMENTS

| | | |
|---|---|---|
| 4,611,323 A | 9/1986 | Hessenmueller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Lee |
| 5,243,598 A | 9/1993 | Lee |
| 5,303,287 A | 4/1994 | Laborde |
| 5,321,736 A | 6/1994 | Beasley |
| 5,321,849 A | 6/1994 | Lemson |
| 5,339,184 A | 8/1994 | Tang |
| 5,377,255 A | 12/1994 | Beasley |
| 5,381,459 A | 1/1995 | Lappington |
| 5,400,391 A | 3/1995 | Emura et al. |
| 5,461,627 A | 10/1995 | Rypinski |
| 5,519,691 A | 5/1996 | Darcie et al. |
| 5,545,397 A | 8/1996 | Spielvogel et al. |
| 5,566,168 A | 10/1996 | Dent |
| 5,621,786 A | 4/1997 | Fischer et al. |
| 5,627,879 A | 5/1997 | Russell et al. |
| 5,634,191 A | 5/1997 | Beasley |
| 5,642,405 A | 6/1997 | Fischer et al. |
| 5,644,622 A | 7/1997 | Russell et al. |
| 5,657,374 A | 8/1997 | Russell et al. |
| 5,678,177 A | 10/1997 | Beasley |
| 5,682,256 A | 10/1997 | Motley et al. |
| 5,687,195 A | 11/1997 | Hwang et al. |
| 5,732,076 A | 3/1998 | Ketseoglou et al. |
| 5,761,619 A | 6/1998 | Danne et al. |
| 5,765,099 A | 6/1998 | Georges et al. |
| 5,781,541 A | 7/1998 | Schneider |
| 5,781,859 A | 7/1998 | Beasley |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,822,324 A | 10/1998 | Kostresti et al. |
| 5,845,199 A | 12/1998 | Longshore |
| 5,852,651 A | 12/1998 | Fischer et al. |
| 5,867,485 A | 2/1999 | Chambers et al. |
| 5,870,392 A | 2/1999 | Ann |
| 5,890,055 A | 3/1999 | Chu et al. |
| 5,907,544 A | 5/1999 | Rypinski |
| 5,914,963 A | 6/1999 | Basile |
| 5,924,022 A | 7/1999 | Beasley et al. |
| 5,987,014 A | 11/1999 | Magill et al. |
| 6,023,628 A | 2/2000 | Beasley |
| 6,034,950 A | 3/2000 | Sauer et al. |
| 6,108,113 A | 8/2000 | Fee |
| 6,108,550 A | 8/2000 | Wiorek et al. |
| 6,108,626 A | 8/2000 | Cellario et al. |
| 6,157,659 A | 12/2000 | Bird |
| 6,157,810 A | 12/2000 | Georges et al. |
| 6,188,693 B1 | 2/2001 | Murakami |
| 6,222,660 B1 | 4/2001 | Traa |
| 6,226,274 B1 | 5/2001 | Reese et al. |
| 6,246,675 B1 | 6/2001 | Beasley et al. |
| 6,373,887 B1 | 4/2002 | Aiyagari et al. |
| 6,377,640 B2 | 4/2002 | Trans |
| 6,498,936 B1 | 12/2002 | Raith |
| 6,567,473 B1 | 5/2003 | Tzannes |
| 6,667,973 B1 | 12/2003 | Gorshe et al. |
| 6,674,966 B1 | 1/2004 | Koonen |
| 6,704,545 B1 | 3/2004 | Wala |
| 6,729,929 B1 | 5/2004 | Sayers et al. |
| 6,768,745 B1 | 7/2004 | Gorshe et al. |
| 6,785,558 B1 | 8/2004 | Stratford et al. |
| 6,826,163 B2 | 11/2004 | Mani et al. |
| 6,826,164 B2 | 11/2004 | Mani et al. |
| 6,831,901 B2 | 12/2004 | Millar |
| 6,865,390 B2 | 3/2005 | Goss et al. |
| 6,917,614 B1 | 7/2005 | Laubach et al. |
| 6,963,552 B2 | 11/2005 | Sabat, Jr. et al. |
| 7,127,175 B2 | 10/2006 | Mani et al. |
| 7,205,864 B2 | 4/2007 | Schultz, Jr. et al. |
| 7,215,651 B2 | 5/2007 | Millar |
| 7,289,972 B2 | 10/2007 | Rieser et al. |
| 7,313,415 B2 | 12/2007 | Wake et al. |
| 7,489,641 B2 * | 2/2009 | Miller et al. ............... 370/241.1 |
| 7,644,177 B2 | 1/2010 | Kouvelas et al. |
| 7,733,901 B2 | 6/2010 | Salkini et al. |
| 7,761,093 B2 | 7/2010 | Sabat, Jr. et al. |
| 7,787,854 B2 | 8/2010 | Conyers et al. |
| 7,920,858 B2 | 4/2011 | Sabat, Jr. et al. |
| 8,902,769 B1 | 12/2014 | Dehghan et al. |
| 8,964,641 B2 | 2/2015 | Dalela et al. |
| 9,178,636 B2 | 11/2015 | Fischer et al. |
| 9,504,039 B2 | 11/2016 | Fischer et al. |
| 10,128,918 B2 | 11/2018 | Fischer et al. |
| 2001/0036163 A1 | 11/2001 | Sabat, Jr. et al. |
| 2001/0044292 A1 | 11/2001 | Jeon et al. |
| 2002/0142739 A1 | 10/2002 | Smith |
| 2002/0167954 A1 | 11/2002 | Highsmith et al. |
| 2002/0191565 A1 | 12/2002 | Mani et al. |
| 2003/0015943 A1 | 1/2003 | Kim et al. |
| 2003/0043928 A1 | 3/2003 | Ling et al. |
| 2003/0203717 A1 | 10/2003 | Chuprun et al. |
| 2004/0010609 A1 | 1/2004 | Vilander et al. |
| 2004/0032354 A1 | 2/2004 | Knobel et al. |
| 2004/0037565 A1 | 2/2004 | Young et al. |
| 2004/0053602 A1 | 3/2004 | Wurzburg |
| 2004/0106387 A1 | 6/2004 | Bauman et al. |
| 2004/0106435 A1 | 6/2004 | Bauman et al. |
| 2004/0132474 A1 | 7/2004 | Wala |
| 2004/0198453 A1 | 10/2004 | Cutrer et al. |
| 2004/0203339 A1 | 10/2004 | Bauman |
| 2004/0203703 A1 | 10/2004 | Fischer |
| 2004/0219950 A1 | 11/2004 | Pallonen et al. |
| 2005/0147067 A1 | 7/2005 | Mani et al. |
| 2005/0201323 A1 | 9/2005 | Mani et al. |
| 2005/0250503 A1 | 11/2005 | Cutrer |
| 2006/0026017 A1 | 2/2006 | Walker |
| 2006/0066484 A1 | 3/2006 | Sayers |
| 2006/0094470 A1 | 5/2006 | Wake et al. |

(56) References Cited

U.S. PATENT DOCUMENTS

| | | |
|---|---|---|
| 2006/0121944 A1 | 6/2006 | Buscaglia et al. |
| 2006/0153070 A1 | 7/2006 | DelRegno et al. |
| 2006/0172775 A1 | 8/2006 | Conyers et al. |
| 2006/0193295 A1 | 8/2006 | White et al. |
| 2006/0250967 A1 | 11/2006 | Miller et al. |
| 2007/0008939 A1 | 1/2007 | Fischer |
| 2009/0316608 A1 | 12/2009 | Singh et al. |
| 2009/0316611 A1 | 12/2009 | Stratford et al. |
| 2010/0177759 A1 | 7/2010 | Fischer et al. |
| 2010/0215028 A1 | 8/2010 | Fischer |
| 2010/0278530 A1 | 11/2010 | Kummetz et al. |
| 2011/0143649 A1 | 6/2011 | Sabat, Jr. et al. |
| 2011/0190005 A1 | 8/2011 | Cheon et al. |
| 2011/0228770 A1 | 9/2011 | Dholakia et al. |
| 2012/0027145 A1 | 2/2012 | Uyehara et al. |
| 2012/0057572 A1 | 3/2012 | Evans et al. |
| 2012/0093084 A1 | 4/2012 | Wala et al. |
| 2012/0106963 A1 | 5/2012 | Huang et al. |
| 2012/0176966 A1 | 7/2012 | Ling |
| 2012/0300766 A1 | 11/2012 | Chen et al. |
| 2013/0003658 A1 | 1/2013 | Stewart et al. |
| 2013/0272463 A1 | 10/2013 | Uyehara et al. |
| 2013/0329633 A1* | 12/2013 | Dalela et al. .................. 370/328 |

FOREIGN PATENT DOCUMENTS

| | | |
|---|---|---|
| CA | 2069462 A1 | 7/1993 |
| CA | 2138763 A1 | 1/1994 |
| CA | 2156046 A1 | 1/1995 |
| CA | 2125411 C | 5/1995 |
| CA | 2128842 A1 | 1/1996 |
| CA | 2134365 A1 | 4/1996 |
| CA | 2087285 A1 | 6/1996 |
| CA | 2158386 A1 | 3/1997 |
| CA | 2168681 A1 | 8/1997 |
| CA | 2215079 A1 | 3/1999 |
| CN | 1455993 A | 11/2003 |
| CN | 102714887 A | 10/2012 |
| EP | 0391597 A2 | 10/1990 |
| EP | 0876073 A2 | 11/1998 |
| EP | 0985324 A2 | 3/2000 |
| EP | 1214809 | 3/2006 |
| GB | 2253770 A | 9/1992 |
| GB | 2289198 A | 11/1995 |
| GB | 2315959 A | 2/1998 |
| GB | 2320653 A | 6/1998 |
| JP | 2000333240 A | 11/2000 |
| JP | 2001197012 A | 7/2001 |
| JP | 2003023396 A | 1/2003 |
| JP | 2004180220 A | 6/2004 |
| JP | 2004194351 A | 7/2004 |
| WO | 9115927 A1 | 10/1991 |
| WO | 9413067 A1 | 6/1994 |
| WO | 9533350 A1 | 12/1995 |
| WO | 9628946 A1 | 9/1996 |
| WO | 9716000 A1 | 5/1997 |
| WO | 9732442 A1 | 9/1997 |
| WO | 9824256 A2 | 6/1998 |
| WO | 9857513 A2 | 12/1998 |
| WO | 9857513 A3 | 12/1998 |
| WO | 9937035 A1 | 7/1999 |
| WO | 0117156 A1 | 3/2001 |
| WO | 0174013 A2 | 10/2001 |
| WO | 0174100 A1 | 10/2001 |
| WO | 0182642 A1 | 11/2001 |
| WO | 03079645 A2 | 9/2003 |
| WO | 2004054290 A1 | 6/2004 |
| WO | 2009138876 A2 | 11/2009 |
| WO | 2009155602 A1 | 12/2009 |
| WO | 2012075137 A1 | 6/2012 |

OTHER PUBLICATIONS

European Patent Office, "Communication pursuant to Article 94(3) from EP Application No. 06772594.5 dated Oct. 5, 2009", from Foreign Counterpart to U.S. Appl. No. 11/150,820, filed Oct. 5, 2009, pp. 1-3, Published: EP.

European Patent Office, "Communication pursuant to Article 94(3) from EP Application No. 06772594.5 dated Nov. 12, 2010", from Foreign Counterpart to U.S. Appl. No. 11/150,820, filed Nov. 12, 2010, pp. 1-5, Published: EP.

European Patent Office, "Communication pursuant to Article 94(3) from EP Application No. 06772594.5 dated Nov. 3, 2011", from Foreign Counterpart to U.S. Appl. No. 11/150,820, filed Nov. 3, 2011, pp. 1-3, Published: EP.

European Patent Office, "Communication pursuant to Article 94(3) from EP Application No. 06772594.5 dated Apr. 14, 2008", from Foreign Counterpart to U.S. Appl. No. 11/150,820, filed Apr. 14, 2008, pp. 1-7, Published: EP.

European Patent Office, "Communication under Rule 71(3) from EP Application No. 06772594.5 dated Sep. 13, 2012", from Foreign Counterpart to U.S. Appl. No. 11/150,820, filed Sep. 13, 2012, pp. 1-6, Published: EP.

U.S. Patent and Trademark Office, "Pre-Appeal Brief Decision", U.S. Appl. No. 11/150,820, filed Jun. 19, 2014, pp. 1-2, Published: US.

European Patent Office, "Extended European Search Report from EP Application No. 11813094.7 dated Aug. 14, 2013", from Foreign Counterpart to U.S. Appl. No. 12/845,060, filed Aug. 14, 2013, pp. 1-6, Published: EP.

European Patent Office, "Extended European Search Report from EP Application No. 14754119.7 dated Nov. 11, 2016", from Foreign Counterpart to U.S. Appl. No. 14/187,135, filed Nov. 11, 2016, pp. 1-12, Published: EP.

European Patent Office, "Extended European Search Report from EP Application No. 18166380.8 dated Jun. 29, 2018", from Foreign Counterpart to U.S. Appl. No. 14/187,135, filed Jun. 29, 2018, pp. 1-13, Published: EP.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

International Bureau, "International Preliminary Report of Patentability from PCT Application No. PCT/US2014/017648 dated Sep. 3, 2015", from Foreign Counterpart to U.S. Appl. No. 14/187,135, filed Sep. 3, 2015, pp. 1-7, Published: WO.

International Bureau, "International Preliminary Report on Patentability from PCT Application No. PCT/US2006/022342 dated Dec. 27, 2007", from Foreign Counterpart to U.S. Appl. No. 11/150,820, filed Dec. 27, 2007, pp. 1-9, Published: WO.

International Bureau, "International Preliminary Report on Patentability from PCT Application No. PCT/US2011/045495 dated Feb. 7, 2013", from Foreign Counterpart to U.S. Appl. No. 12/845,060, filed Feb. 7, 2013, pp. 1-6, Published: WO.

International Bureau, "International Preliminary Report on Patentablity from PCT Application No. PCT/US2011/057575 dated May 10, 2013", from Foreign Counterpart to U.S. Appl. No. 12/913,179, filed May 10, 2013, pp. 1-7, Published: WO.

"Tektronix Synchronous Optical Network (SONET)", "http://www.iec.org/online/tutorials/sonet/topic03.html", Aug. 28, 2002, pp. 1-5, Publisher: International Engineering Consortium.

International Searching Authority, "International Search Report and Written Opinion from PCT Application No. PCT/US2006/022342 dated Nov. 7, 2006", from Foreign Counterpart to U.S. Appl. No. 11/150,820, filed Nov. 7, 2006, pp. 1-13, Published: WO.

International Searching Authority, "International Search Report and Written Opinion from PCT Application No. PCT/US2011/045495 dated Feb. 17, 2012", from Foreign Counterpart to U.S. Appl. No. 12/845,060, filed Feb. 17, 2012, pp. 1-9, Published: WO.

International Searching Authority, "International Search Report and Written Opinion from PCT Application No. PCT/US2011/057575

(56) References Cited

OTHER PUBLICATIONS dated Feb. 17, 2012", from Foreign Counterpart to U.S. Appl. No. 12/913,179, filed Feb. 17, 2012, pp. 1-10, Published: WO.
International Searching Authority, "International Search Report and Written Opinion from PCT Application No. PCT/US2014/017648 dated Jun. 16, 2014", from Foreign Counterpart to U.S. Appl. No. 14/187,135, filed Jun. 16, 2014, pp. 1-11, Published: WO.
Japanese Patent Office, "Decision of Final Rejection from JP Application No. 2008-515931 dated Feb. 28, 2012", from Foreign Counterpart to U.S. Appl. No. 11/150,820, filed Feb. 28, 2012, pp. 1-8, Published: JP.
Japanese Patent Office, "Notice of Reasons for Rejection from JP Application No. 2008-515931 dated Nov. 1, 2011", from Foreign Counterpart to U.S. Appl. No. 11/150,820, filed Nov. 1, 2011, pp. 1-10, Published: JP.
Korean Intellectual Property Office, "Decision to Grant from KR Application No. 2007-7030470 dated Jul. 17, 2013", from Foreign Counterpart to U.S. Appl. No. 11/150,820, filed Jul. 17, 2013, pp. 1-6, Published: KR.
Korean Intellectual Property Office, "Office Action from KR Application No. 2007-7030470 dated Sep. 17, 2012", from Foreign Counterpart to U.S. Appl. No. 11/150,820, filed Sep. 17, 2012, pp. 1-5, Published: KR.
State Intellectual Property Office, P.R. China, "Notification of Correction of Notice of Grant of Patent Right for Invention from CN Application No. 201210153142.2 dated Jul. 10, 2015", from Foreign Counterpart to U.S. Appl. No. 11/150,820, filed Jul. 10, 2015, pp. 1-4, Published: CN.
U.S. Patent and Trademark Office, "Pre-Appeal Brief Decision", U.S. Appl. No. 12/775,897, filed Sep. 18, 2012, pp. 1-2, Published: US.
State Intellectual Property Office, P.R. China, "Notification to Grant Patent Right for Invention from CN Application No. 200680029629.2 dated Mar. 2, 2012", from Foreign Counterpart to U.S. Appl. No. 11/150,820, filed Mar. 2, 2012, pp. 1-4, Published: CN.
State Intellectual Property Office, P.R. China, "Notification to Grant Patent Right for Invention from CN Application No. 201210153142.2 dated Jul. 2, 2015", from Foreign Counterpart to U.S. Appl. No. 11/150,820, filed Jul. 2, 2015, pp. 1-5, Published: CN.
State Intellectual Property Office, P.R. China, "Office Action from CN Application No. 200680029629.2 dated Oct. 9, 2010", from Foreign Counterpart to U.S. Appl. No. 11/150,820, filed Oct. 9, 2010, pp. 1-33, Published: CN.
State Intellectual Property Office, P.R. China, "Office Action from CN Application No. 200680029629.2 dated Nov. 16, 2011", from Foreign Counterpart to U.S. Appl. No. 11/150,820, filed Nov. 16, 2011, pp. 1-10, Published: CN.
State Intellectual Property Office, P.R. China, "Office Action from CN Application No. 200680029629.2 dated Aug. 10, 2011", from Foreign Counterpart to U.S. Appl. No. 11/150,820, filed Aug. 10, 2011, pp. 1-31, Published: CN.
State Intellectual Property Office, P.R. China, "Office Action from CN Application No. 201210153142.2 dated Oct. 24, 2014", from Foreign Counterpart to U.S. Appl. No. 11/150,820, filed Oct. 24, 2014, pp. 1-7, Published: CN.
State Intellectual Property Office, P.R. China, "Office Action from CN Application No. 201210153142.2 dated Feb. 25, 2014", from Foreign Counterpart to U.S. Appl. No. 11/150,820, filed Feb. 25, 2014, pp. 1-31, Published: CN.
State Intellectual Property Office, P.R. China, "Office Action from CN Application No. 201480022950.2 dated Oct. 10, 2017", from Foreign Counterpart to U.S. Appl. No. 14/187,135, filed Oct. 10, 2017, pp. 1-10, Published: CN.
U.S. Patent and Trademark Office, "Advisory Action", U.S. Appl. No. 11/150,820, dated Apr. 30, 2014, pp. 1-3, Published: US.
U.S. Patent and Trademark Office, "Corrected Notice of Allowability", U.S. Appl. No. 12/845,060, dated Mar. 28, 2013, pp. 1-25, Published: US.
U.S. Patent and Trademark Office, "Corrected Notice of Allowability", U.S. Appl. No. 14/187,135, dated Sep. 30, 2015, pp. 1-6, Published: US.
U.S. Patent and Trademark Office, "Corrected Notice of Allowability", U.S. Appl. No. 15/357,617, dated Aug. 15, 2018, pp. 1-16, Published: US.
U.S. Patent and Trademark Office, "Decision on Appeal", U.S. Appl. No. 11/150,820, filed Nov. 19, 2012, pp. 1-6, Published: US.
U.S. Patent and Trademark Office, "Decision on Appeal", U.S. Appl. No. 12/775,897, filed Sep. 2, 2015, pp. 1-12, Published: US.
U.S. Patent and Trademark Office, "Examiner's Answer", U.S. Appl. No. 11/150,820, filed Nov. 17, 2009, pp. 1-24, Published: US.
U.S. Patent and Trademark Office, "Examiner's Answer", U.S. Appl. No. 11/150,820, filed Nov. 4, 2014, pp. 1-31, Published: US.
U.S. Patent and Trademark Office, "Examiner's Answer", U.S. Appl. No. 12/775,897, filed Jan. 4, 2013, pp. 1-30, Published: US.
U.S. Patent and Trademark Office, "Final Office Action", U.S. Appl. No. 11/150,820, dated Dec. 29, 2008, pp. 1-27, Published: US.
U.S. Patent and Trademark Office, "Final Office Action", U.S. Appl. No. 11/150,820, dated Feb. 6, 2014, pp. 1-20, Published: US.
U.S. Patent and Trademark Office, "Final Office Action", U.S. Appl. No. 11/150,820, dated Sep. 27, 2007, pp. 1-25, Published: US.
U.S. Patent and Trademark Office, "Final Office Action", U.S. Appl. No. 12/775,897, dated May 7, 2012, pp. 1-26, Published: US.
U.S. Patent and Trademark Office, "Interview Summary", U.S. Appl. No. 14/187,135, dated Apr. 6, 2015, pp. 1-3, Published: US.
U.S. Patent and Trademark Office, "Notice of Allowance", U.S. Appl. No. 12/845,060, dated Mar. 4, 2013, pp. 1-10, Published: US.
U.S. Patent and Trademark Office, "Notice of Allowance", U.S. Appl. No. 13/914,838, dated May 15, 2014, pp. 1-16, Published: US.
U.S. Patent and Trademark Office, "Notice of Allowance", U.S. Appl. No. 14/187,135, dated May 6, 2015, pp. 1-37, Published: US.
U.S. Patent and Trademark Office, "Notice of Allowance", U.S. Appl. No. 14/851,391, dated Jul. 13, 2016, pp. 1-43, Published: US.
U.S. Patent and Trademark Office, "Notice of Allowance", U.S. Appl. No. 15/357,617, dated Oct. 30, 2017, pp. 1-44, Published: US.
U.S. Patent and Trademark Office, "Notice of Allowance", U.S. Appl. No. 15/357,617, dated Apr. 6, 2018, pp. 1-13, Published: US.
U.S. Patent and Trademark Office, "Office Action", U.S. Appl. No. 11/150,820, dated Mar. 16, 2007, pp. 1-21, Published: US.
U.S. Patent and Trademark Office, "Office Action", U.S. Appl. No. 11/150,820, dated Mar. 24, 2008, pp. 1-17, Published: US.
U.S. Patent and Trademark Office, "Office Action", U.S. Appl. No. 11/150,820, dated Sep. 6, 2013, pp. 1-31, Published: US.
U.S. Patent and Trademark Office, "Office Action", U.S. Appl. No. 12/775,897, dated Dec. 28, 2011, pp. 1-29, Published: US.
U.S. Patent and Trademark Office, "Office Action", U.S. Appl. No. 12/845,060, dated Oct. 2, 2012, pp. 1-28, Published: US.
U.S. Patent and Trademark Office, "Office Action", U.S. Appl. No. 12/913,179, dated Mar. 18, 2013, pp. 1-49, Published: US.
U.S. Patent and Trademark Office, "Office Action", U.S. Appl. No. 13/914,838, dated Nov. 20, 2013, pp. 1-47, Published: US.
U.S. Patent and Trademark Office, "Office Action", U.S. Appl. No. 14/187,135, dated Jan. 2, 2015, pp. 1-63, Published: US.

* cited by examiner

# UNIVERSAL REMOTE RADIO HEAD

CROSS-REFERENCE TO RELATED APPLICATIONS

This application is a continuation application of U.S. patent application Ser. No. 15/357,617 (hereafter the '617 application) entitled "UNIVERSAL REMOTE RADIO HEAD", filed on Nov. 21, 2016 (currently pending) which is a continuation application of U.S. patent application Ser. No. 14/851,391 (hereafter the '391 application) entitled "UNIVERSAL REMOTE RADIO HEAD", filed on Sep. 11, 2015 which is a continuation application of U.S. patent application Ser. No. 14/187,135 (hereafter the '135 application) entitled "UNIVERSAL REMOTE RADIO HEAD", filed on Feb. 21, 2014 which claims the benefit of U.S. Provisional Patent Application Ser. No. 61/768,038 filed on Feb. 22, 2013, each of which are hereby incorporated herein by reference.

BACKGROUND

Distributed base stations systems may include base station baseband signal processing functionality and base station control functionality and remote radio heads. Remote radio heads may include radio frequency (RF) transceivers and power amplifiers. In exemplary distributed base station radio systems, digital baseband data is transported between the baseband processing unit located in the host unit and the remotely located radio frequency (RF) transceivers located at the remote units. In exemplary distributed base station radio systems, the baseband processing unit communicates with the remote radio head using channelized Common Public Radio Interface (CPRI) signals and/or Open Base Station Architecture Initiative (OBSAI) signals.

SUMMARY

A distributed base station radio system includes a first channelized to broadband conversion unit configured to receive first downlink channelized data for a first radio frequency band from a first channelized radio frequency source; and a first universal remote radio head communicatively coupled to the first channelized to broadband conversion unit. The first channelized to broadband conversion unit is further configured to convert the first downlink channelized data into a first downlink broadband signal. The first channelized to broadband conversion unit is further configured to communicate the first downlink broadband signal to the first universal remote radio head. The first universal remote radio head is configured to receive the first downlink broadband signal. The first universal remote radio head is further configured to frequency convert the first downlink broadband signal into first downlink radio frequency signals in the first radio frequency band. The first universal remote radio head is further configured to transmit the first downlink radio frequency signals in the first radio frequency band to a first subscriber unit.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Like reference numbers and designations in the various drawings indicate like elements.

DETAILED DESCRIPTION

Figure 1A:
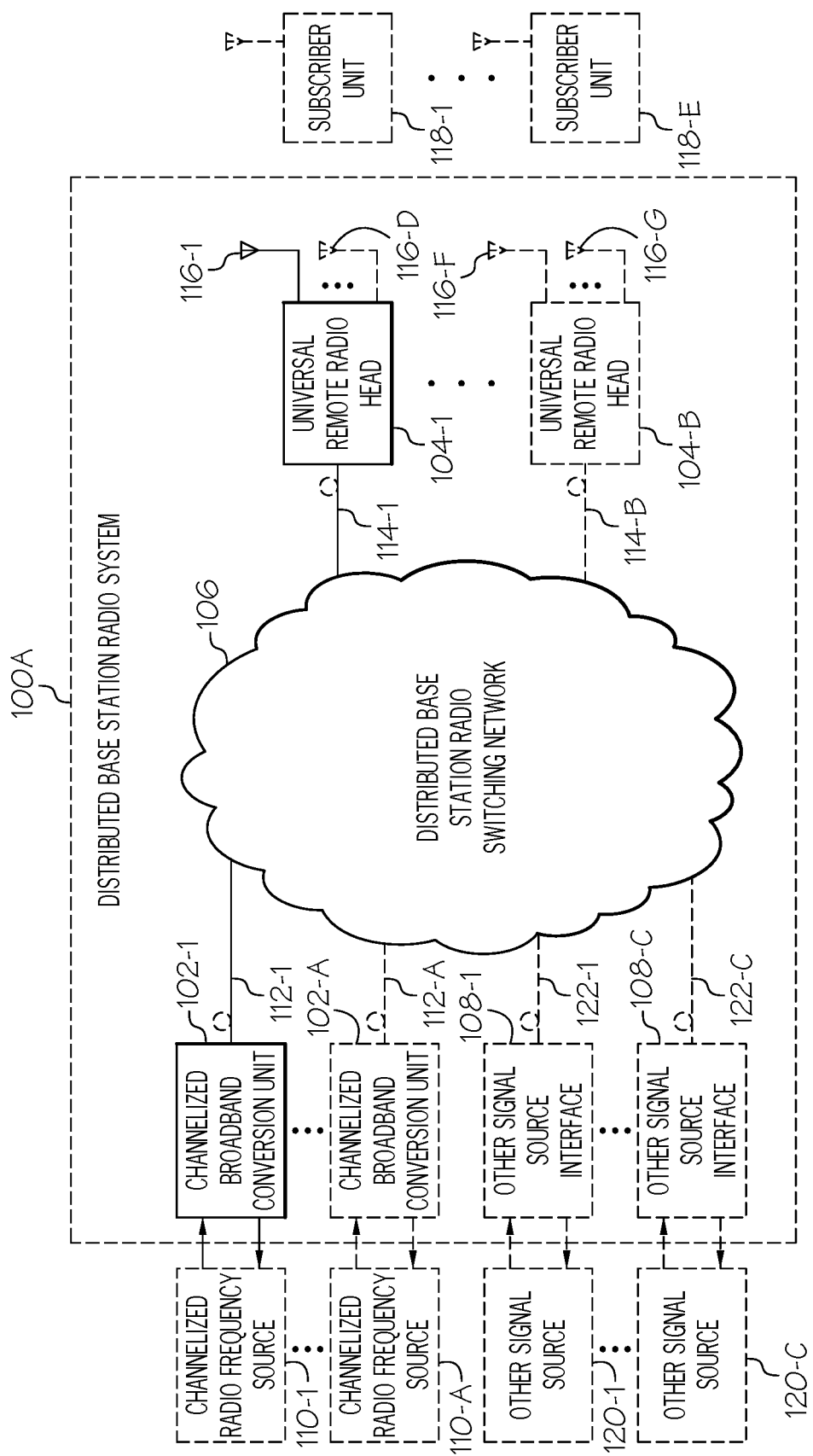
FIGS. 1A-1B are block diagrams of exemplary embodiments of distributed base station radio systems.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below describe a distributed base station radio system including at least one channelized broadband conversion unit communicatively coupled to at least one universal remote radio head. The channelized broadband conversion unit is communicatively coupled to a channelized radio frequency source, usually at a base station. In exemplary embodiments, the channelized broadband conversion unit is at least one of a Common Public Radio Interface (CPRI) base station interface, an Open Base Station Architecture Initiative (OBSAI) base station interface, and an Open Radio Interface (ORI) base station interface. In exemplary embodiments, the channelized broadband conversion source includes a representation of an individual channel at baseband. In exemplary embodiments, the channelized broadband conversion unit converts the representation of the individual channel at baseband into a broadband signal capable of representing a number of individual channels together in a single broadband signal. A broadband signal includes individual channels positioned within a set of spectrum that reflects each channels location within the RF spectrum. When aggregated, the individual channels within the broadband signals do not overlap each other. This broadband signal has a single center frequency while the individual channelized signals each have their own center frequency.

This broadband signal is then distributed through a distributed base station radio switching network to at least one universal remote radio head. The universal remote radio head is multi-standard and capable of receiving the broadband signal and converting it to radio frequency (RF) and transmitting it using at least one antenna. The universal remote radio head is not specific to a number of channels or an air protocol and does not necessarily require any hardware change when channels are added or removed, or a new modulation type or air protocol is used. In exemplary embodiments, a plurality of channelized broadband conversion units convert a plurality of channelized radio frequency signals received from a plurality of channelized radio frequency sources and representing individual channels into a single broadband signal that is transported through the distributed base station radio switching network to at least one universal remote radio head that converts the single broadband signal into radio frequency (RF) signals and transmits them using at least one antenna. In exemplary embodiments, the at least one universal remote radio head includes a single digital/analog converter and a single RF converter that can up-convert the entire broadband signal into RF spectrum having various channels.

As described herein, channelized signals are specific to a particular channel. In exemplary embodiments, the channelized signals are baseband data, such as channelized in-phase (I) and quadrature (Q) data. The channelized signals are not positioned relative to one another and require additional baseband conversion before RF conversion and transmission can be performed. Specifically, systems that communicate the channelized signals to remote radio heads will require additional processing at the remote radio head to convert the channelized signals before RF conversion and transmission. Accordingly, the remote radio heads are more complex and less flexible than the universal remote radio heads described below.

In contrast, broadband signals are not specific to a particular channel and may include a number of different channels. The broadband signals represent either digitized or analog spectrum and are one step closer to RF signals than the channelized signals. In exemplary embodiments, the broadband signal is at an intermediate frequency that maps to a large portion of RF spectrum including a number of channels. In exemplary embodiments, the broadband signals can simply be up-converted from the intermediate frequency to radio frequency and transmitted at a universal remote radio head as described below. Thus, the universal remote radio heads do not need the capability of processing channelized signals before RF conversion and transmission. Accordingly, universal remote radio heads are less complex. In addition, it doesn't matter what channels are sent to the universal remote radio heads. In exemplary embodiments, the universal remote radio head communicates with subscriber units using a first set of channels at first frequencies and a second set of channels at second frequencies. In exemplary embodiments, the universal remote radio head communicates using different modulation and/or radio access technologies simultaneously.

Figure 1B:
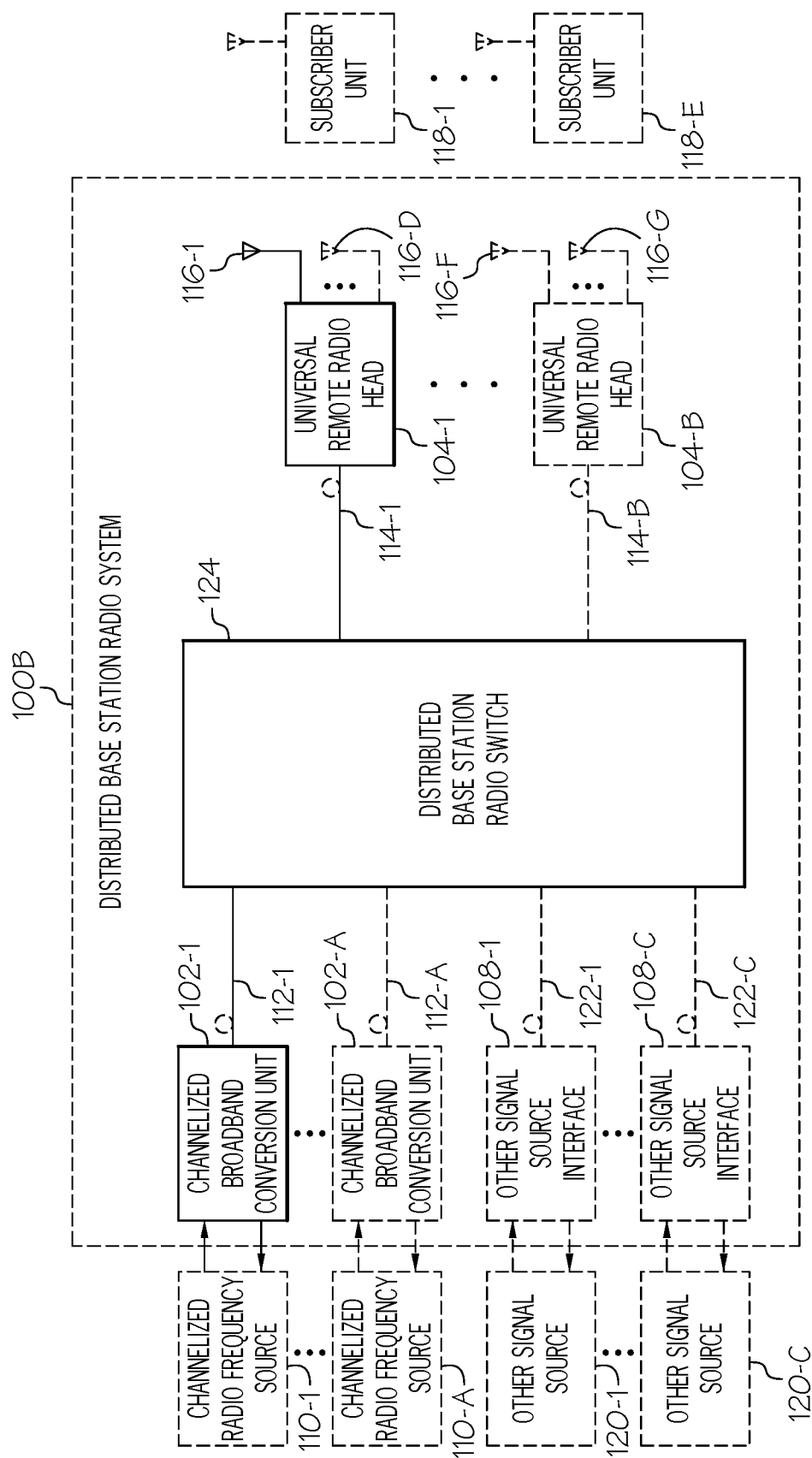

FIG. 1A-1B are block diagrams of exemplary embodiments of distributed base station radio systems 100. Each of FIGS. 1A-1B illustrates a different embodiment of a distributed base station radio system 100, labeled 100A-100B respectively.

FIG. 1A is a block diagram of an exemplary embodiment of a distributed base station radio system 100, distributed base station radio system 100A. Distributed base station radio system 100A includes at least one channelized broadband conversion unit 102 (including channelized broadband conversion unit 102-1 and any number of optional channelized broadband conversion units 102 through optional channelized broadband conversion unit 102-A), at least one universal remote radio head 104 (including universal remote radio head 104-1 and any number of optional universal remote radio heads 104 through optional universal remote radio head 104-B), a distributed base station radio switching network 106, and optional other signal source interfaces 108 (including any number of optional other signal source interfaces 108 such as optional other signal source interface 108-1 through optional other signal source interface 108-C).

Each channelized broadband conversion unit 102 is communicatively coupled to a channelized radio frequency source 110 that is configured to provide a channelized signal representing a single channel to be transported through the distributed base station radio system 100A to the channelized broadband conversion unit 102-1. In the forward path, each channelized broadband conversion unit 102 is configured to receive a channelized signal representing a single channel from a corresponding channelized radio frequency source 110. Specifically, channelized broadband conversion unit 102-1 is communicatively coupled to channelized radio frequency source 110-1 and optional channelized broadband conversion unit 102-A is communicatively coupled to optional channelized radio frequency source 110-A. Each channelized broadband conversion unit 102 is also communicatively coupled to the distributed base station radio switching network 106 across a communication link 112. Specifically, channelized broadband conversion unit 102-1 is communicatively coupled to the distributed base station radio switching network 106 across communication link 112-1 and optional channelized broadband conversion unit 102-A is communicatively coupled to the distributed base station radio switching network 106 across communication link 112-A. As described in more detail below, each channelized broadband conversion unit 102 is configured to convert a channelized signal from a corresponding channelized radio frequency source 110 into a downlink broadband signal and further configured to communicate the downlink broadband signal to the distributed base station radio switching network 106 (either directly or through other components of the distributed base station radio system 100A) across a respective communication link 112. Each downlink broadband signal contains an individual channel that is positioned within a set of spectrum that reflects its location within the RF spectrum. Said another way, the channel in each downlink broadband signal is at a different RF frequency than the other channels to which it is being aggregated. Thus, when multiple downlink broadband signals are aggregated together, the individual channels do not overlap each other and all channels can be upconverted together to radio frequency spectrum simultaneously.

Similarly in the reverse path, in exemplary embodiments each channelized broadband conversion unit 102 is configured to receive uplink broadband signals across a respective communication link 112 from distributed base station radio switching network 106. Each channelized broadband conversion unit 102 is further configured to convert the received uplink broadband signal to a channelized signal for the corresponding channelized radio frequency source 110 and is further configured to communicate the channelized signal to the corresponding channelized radio frequency source 110. In exemplary embodiments, the uplink broadband signal is an aggregate of the uplink broadband signals from at least one universal remote radio head 104. For example, the uplink broadband signal may be an aggregate of the uplink broadband signals from any number of universal remote radio heads 104.

In exemplary embodiments, the communication links 112 are optical fibers and the communication across the communication links 112 is optical. In these embodiments, an electrical to optical conversion occurs at the channelized broadband conversion units 102. In other embodiments, the communication links 112 are conductive cables (such as coaxial cable, twisted pair, etc.) and the communication across the communication links 112 is electrical. In exemplary embodiments, the communication across the communication links 112 is analog communication. In other exemplary embodiments, the communication across the communication links 112 is digital communication. In exemplary embodiments, any mixture of optical, electrical, analog, and digital communication occurs across the communication links 112. In exemplary embodiments, a channelized broadband conversion unit 102 may include functionality to convert between digital and analog signals.

Distributed base station radio switching network 106 communicatively couples the at least one channelized broadband conversion unit 102 and the optional other signal source interfaces 108 with the at least one universal remote radio head 104. Distributed base station radio switching network 106 may include one or more distributed base station radio switches or other components that functionally distributes downlink broadband signals from the at least one channelized broadband conversion unit 102 to the at least one universal remote radio head 104. In exemplary embodiments, the distributed base station radio switching network 106 aggregates downlink broadband signals from a plurality of channelized broadband conversion units 102 into a single aggregate downlink broadband signal that is routed to at least one universal remote radio head 104. Distributed base station radio switching network 106 also functionally distributes uplink broadband signals from the at least one universal remote radio head 104 to the at least one channelized broadband conversion unit 102. In exemplary embodiments, the distributed base station radio switching network 106 aggregates uplink broadband signals from a plurality of universal remote radio heads 104 into a single aggregate uplink broadband signal that is routed to at least one channelized broadband conversion unit 102.

In exemplary embodiments, the communication links 122 between the other signal source interfaces 108 and the distributed base station radio switching network 106 are optical fibers and the communication across the communication links 122 are optical. In these embodiments, an electrical to optical conversion occurs at the other signal source interfaces 108. In other embodiments, the communication links 122 are conductive cables (such as coaxial cable, twisted pair, etc.) and the communication across the communication links 122 is electrical. In exemplary embodiments, the communication across the communication links 122 is analog communication. In other exemplary embodiments, the communication across the communication links 122 is digital communication. In exemplary embodiments, any mixture of optical, electrical, analog, and digital communication occurs across the communication links 122. In exemplary embodiments, an other signal source interface 108 may include functionality to convert between digital and analog signals.

Each universal remote radio head 104 is communicatively coupled to the distributed base station radio switching network 106 across a communication link 114. Specifically, universal remote radio head 104-1 is communicatively coupled to the distributed base station radio switching network 106 across communication link 114-1 and optional universal remote radio head 104-B is communicatively coupled to the distributed base station radio switching network 106 across communication link 114-B. Each universal remote radio head 104 includes components configured for converting between at least one downlink broadband signal and at least one radio frequency band signal and at least one radio frequency antenna 116 configured to transmit and receive signals in the at least one radio frequency band to/from at least one subscriber unit 118. In exemplary embodiments, the downlink broadband signal is an aggregate of multiple downlink broadband signals each with a channel positioned within a set of spectrum that reflects its location within the RF spectrum. In exemplary embodiments having multiple downlink broadband signals aggregated together, the individual channels can be converted to the at least one radio frequency band signals simultaneously.

In the downstream, each universal remote radio head 104 is configured to convert the at least one downlink broadband signal into a downlink radio frequency (RF) signal in a radio frequency band. In exemplary embodiments, this may include digital to analog converters and oscillators. Each universal remote radio head 104 is further configured to transmit the downlink radio frequency signal in the radio frequency band to at least one subscriber unit 118 using at least one radio frequency antenna 116. In a specific exemplary embodiment, universal remote radio head 104-1 is configured to convert the at least one downlink broadband signal received from the distributed base station radio switching network 106 into a downlink radio frequency signal in a radio frequency band. Universal remote radio head 104-1 is further configured to transmit the downlink radio frequency signal in a radio frequency band using a radio frequency band antenna 116-1 to at least one subscriber unit 118-1. In exemplary embodiments, universal remote radio head 104-1 is configured to convert the at least one downlink broadband signal received from the distributed base station radio switching network 106 into a plurality of downlink radio frequency signals in a plurality of radio frequency bands. In these exemplary embodiments, universal remote radio head 104-1 is further configured to transmit the plurality of downlink radio frequency signals in the plurality of radio frequency bands using the radio frequency band antenna 116-1 and optional other radio frequency band antennas 116 through optional other radio frequency band antenna 116-D. In exemplary embodiments, the universal remote radio head 104-1 is configured to transmit one downlink radio frequency signal to one subscriber unit 118-1 using an antenna 116-1 and another radio frequency signal to one subscriber unit 118-E using another antenna 116-D. In exemplary embodiments, other combinations of radio frequency antennas 116 and other components are used to communicate other combinations of radio frequency signals in other various radio frequency bands to various subscriber units 118, such as but not limited to using multiple antenna to communicate with a single subscriber unit 118.

Similarly in the reverse path, in exemplary embodiments, each universal remote radio head 104 is configured to receive uplink radio frequency signals from at least one subscriber unit 118 using at least one radio frequency antenna 116. Each universal remote radio head 104 is further configured to convert the radio frequency signals to at least one uplink broadband signal. Each universal remote radio head 104 is further configured to aggregate the at least one uplink broadband signal into an aggregate uplink broadband signal and further configured to communicate the aggregate uplink broadband signal across at least one communication link 114 to the distributed base station radio switching network. In exemplary embodiments, universal remote radio heads 104 multiplex uplink signals in different bands onto the same interface for communication to the next upstream element. In other exemplary embodiments (such as example embodiments implementing diversity processing), where the universal remote radio head 104 could aggregate (i.e. sum/combine) uplink signals in an intelligent manner. In exemplary embodiments, each uplink broadband signal contains a channel that is positioned within a set of spectrum that reflects its location within the RF spectrum. Thus and even though the uplink broadband signals that are aggregated will overlap in frequency spectrum, the individual channels themselves from the aggregated uplink broadband signals do not overlap each other when multiple uplink broadband signals are aggregated together.

In exemplary embodiments, the communication links 114 are optical fibers and the communication across the communication links 114 is optical. In these embodiments, an electrical to optical conversion occurs at the universal remote radio heads 104. In other embodiments, the communication links 114 are conductive cables (such as coaxial cable, twisted pair, etc.) and the communication across the communication links 114 is electrical. In exemplary embodiments, the communication across the communication links 114 is analog communication. In other exemplary embodiments, the communication across the communication links 114 is digital communication. In exemplary embodiments, any mixture of optical, electrical, analog, and digital communication occurs across the communication links 114. In exemplary embodiments, a universal remote radio head 104 may include functionality to convert between digital and analog signals.

FIG. 1B is a block diagram of an exemplary embodiment of a distributed base station radio system 100, distributed base station radio system 100B. Distributed base station radio system 100B includes at least one channelized broadband conversion unit 102 (including channelized broadband conversion unit 102-1 and any number of optional channelized broadband conversion units 102 through optional channelized broadband conversion unit 102-A), at least one universal remote radio head 104 (including universal remote radio head 104-1 and any number of optional universal remote radio heads 104 through optional universal remote radio head 104-B), a distributed base station radio switch 124, and optional other signal source interfaces 108 (including any number of optional other signal source interfaces 108 such as optional other signal source interface 108-1 through optional other signal source interface 108-C). Distributed base station radio system 100B includes similar components to distributed base station radio system 100A described above and operates according to similar principles and methods as distributed base station radio system 100A described above. The difference between distributed base station radio system 100B and distributed base station radio system 100A is that the distributed base station radio switching network 106 is replaced with a single distributed base station radio switch 124.

Distributed base station radio switch 124 communicatively couples the at least one channelized broadband conversion unit 102 and the optional other signal source interfaces 108 with the at least one universal remote radio head 104. Distributed base station radio switch 124 functionally distributes downlink broadband signals from the at least one channelized broadband conversion unit 102 to the at least one universal remote radio head 104. In exemplary embodiments, the distributed base station radio switch 124 aggregates downlink broadband signals from a plurality of channelized broadband conversion units 102 into a single aggregate downlink broadband signal that is routed to at least one universal remote radio head 104. Distributed base station radio switch 124 also functionally distributes uplink broadband signals from the at least one universal remote radio head 104 to the at least one channelized broadband conversion unit 102 and any optional channelized broadband conversion units 102 and/or optional other signal source interfaces 108. In exemplary embodiments, the distributed base station radio switch 124 aggregates uplink broadband signals from a plurality of universal remote radio heads 104 into a single aggregate uplink broadband signal that is routed to at least one channelized broadband conversion unit 102.

Figure 2A:
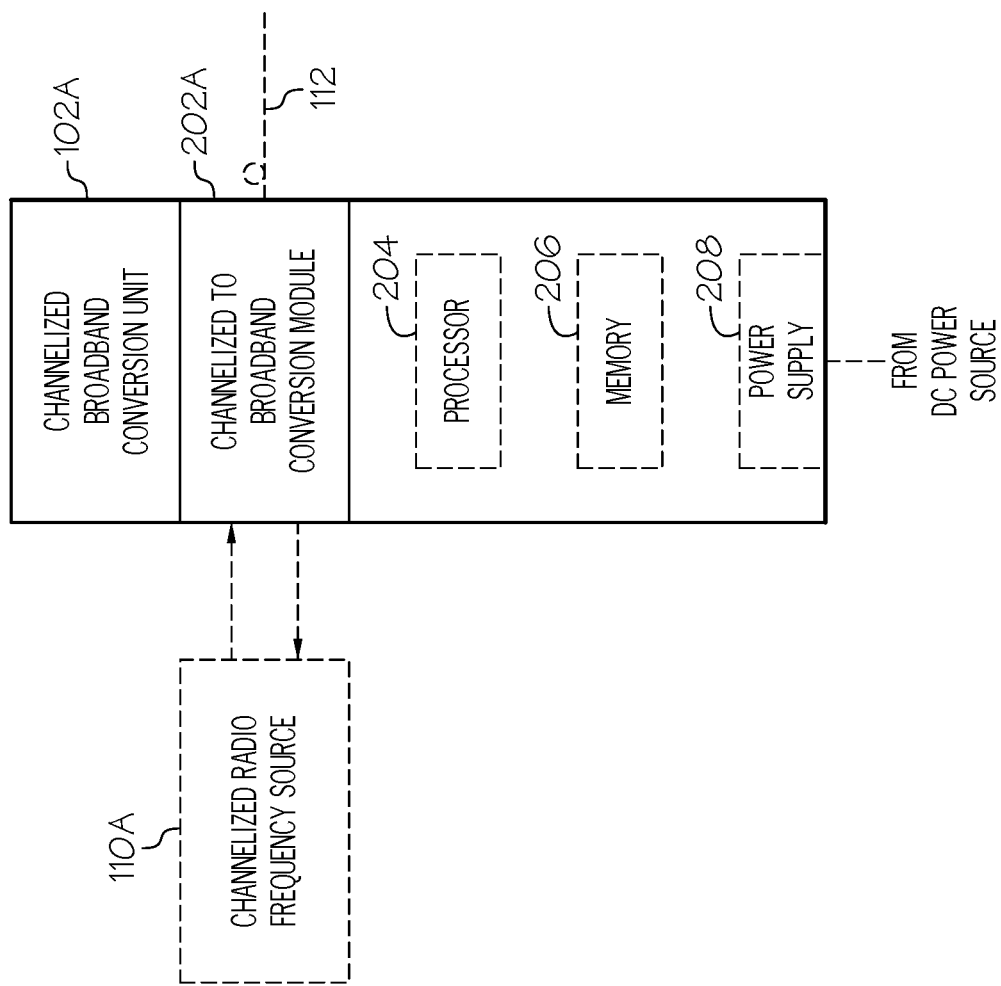
FIGS. 2A-2C are block diagrams of exemplary embodiments of channelized broadband conversion units used in distributed base station radio systems, such as the exemplary distributed base station radio systems in FIGS. 1A-1B.
Figure 2B:
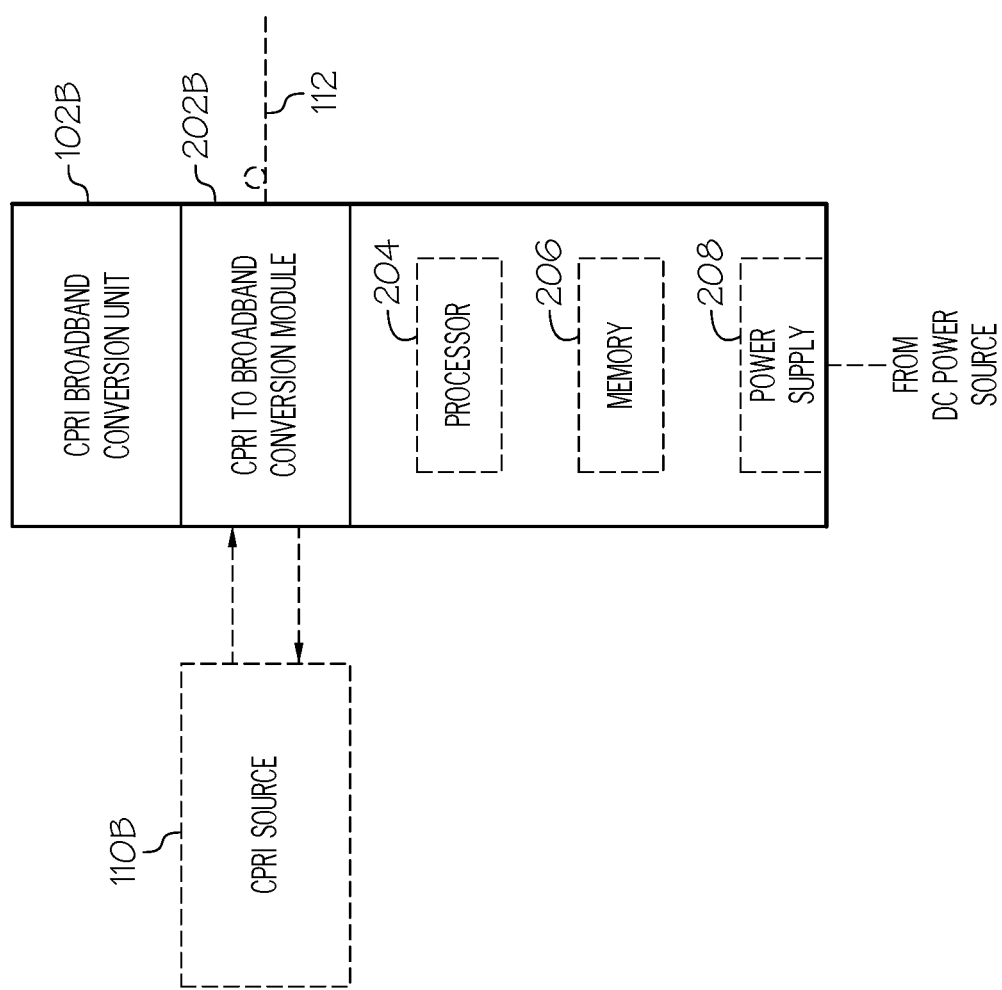
Figure 2C:
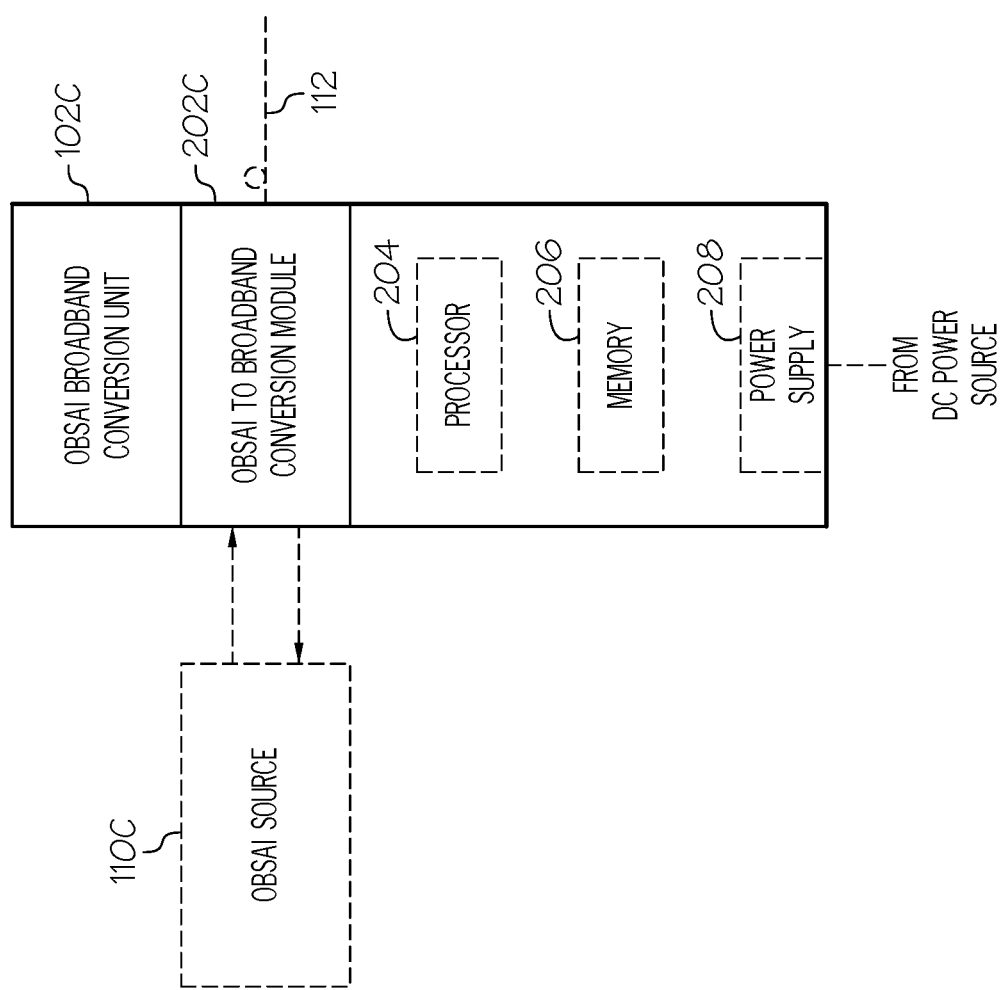

FIGS. 2A-2C are block diagrams of exemplary embodiments of channelized broadband conversion units 102 used in distributed base station radio systems, such as the exemplary distributed base station radio system 100 described above. Each of FIGS. 2A-2C illustrates a different embodiment of a type of base station network interface 102, labeled 102A-102C respectively.

FIG. 2A is a block diagram of an exemplary embodiment of a channelized broadband conversion unit 102, channelized broadband conversion unit 102A. Channelized broadband conversion unit 102A includes channelized to broadband conversion module 202A, an optional processor 204, optional memory 206, and an optional power supply 208. In exemplary embodiments, channelized to broadband conversion module 202A is communicatively coupled to at least one channelized radio frequency source 110. Channelized to broadband conversion module 202A is also communicatively coupled to at least one communication link 112. In exemplary embodiments, the communication link 112 is an optical communication link across a fiber optic cable, though it can also be other types of wired or wireless links in other embodiments. In exemplary embodiments, the channelized to broadband conversion module 202 is implemented using optional processor 204 and optional memory 206. In exemplary embodiments, the optional power supply 208 provides power to the various elements of the channelized broadband conversion unit 102A.

In the downlink, channelized to broadband conversion module 202A is configured to receive a channelized downlink signal from the channelized radio frequency source 110A. The channelized to broadband conversion module 202A is further configured to convert the channelized downlink signal to a downlink broadband signal. In exemplary embodiments, the channelized to broadband conversion module 202 (or another additional component) further converts the downlink broadband signal from electrical signals to optical signals for output on an optical communication link 112. In other embodiments, the downlink broadband signal is transported using a conductive communication medium, such as coaxial cable or twisted pair, and the optical conversion is not necessary. In exemplary embodiments, the channelized to broadband conversion module 202 (or another additional component) further converts between digital and analog signals as required.

In the uplink, channelized to broadband conversion module 202A is configured to receive an uplink broadband signal from communication link 112. In exemplary embodiments where communication link 112 is an optical medium, the channelized to broadband conversion module 202A (or another additional component) is configured to convert the uplink broadband signal between received optical signals and electrical signals. In other embodiments, the uplink broadband signal is transported using a conductive communication medium, such as coaxial cable or twisted pair, and the optical conversion is not necessary. In exemplary embodiments, the channelized to broadband conversion module 202 (or another additional component) further converts between digital and analog signals as required. The channelized to broadband conversion module 202A is further configured to convert the uplink broadband signal to at least one uplink channelized signal. Channelized to broadband conversion module 202A is further configured to communicate the uplink channelized signals to the channelized radio frequency source 110A.

FIG. 2B is a block diagram of an exemplary embodiment of a channelized broadband conversion unit 102, Common Public Radio Interface (CPRI) broadband conversion unit 102B. CPRI broadband conversion unit 102B includes Common Public Radio Interface (CPRI) to broadband conversion module 202B, an optional processor 204, optional memory 206, and an optional power supply 208. CPRI broadband conversion unit 102B includes similar components to channelized broadband conversion unit 102A and operates according to similar principles and methods as channelized broadband conversion unit 102A. The difference between CPRI broadband conversion unit 102B and the channelized broadband conversion unit 102A is that the CPRI broadband conversion unit 102B is CPRI specific and includes the CPRI to broadband conversion module 202B that is communicatively coupled to at least one Common Public Radio Interface (CPRI) source 110B. CPRI broadband conversion unit 102B converts between CPRI channelized signals and broadband signals. In the downlink, CPRI broadband conversion unit 102B converts downlink CPRI channelized signals into a downlink broadband signal. In the uplink, CPRI broadband conversion unit 102B converts an uplink broadband signal into uplink CPRI channelized signals.

FIG. 2C is a block diagram of an exemplary embodiment of a channelized broadband conversion unit 102, Open Base Station Architecture Initiative (OBSAI) broadband conversion unit 102C. OBSAI broadband conversion unit 102C includes Open Base Station Architecture Initiative (OBSAI) to broadband conversion module 202C, an optional processor 204, optional memory 206, and an optional power supply 208. OBSAI broadband conversion unit 102C includes similar components to channelized broadband conversion unit 102A and operates according to similar principles and methods as channelized broadband conversion unit 102A. The difference between OBSAI broadband conversion unit 102C and the channelized broadband conversion unit 102A is that the OBSAI broadband conversion unit 102C is OBSAI specific and includes the OBSAI to broadband conversion module 202C that is communicatively coupled to at least one Open Base Station Architecture Initiative (OBSAI) source 110C. OBSAI broadband conversion unit 102C converts between OBSAI channelized signals and broadband signals. In the downlink, OBSAI broadband conversion unit 102C converts downlink OBSAI channelized signals into a downlink broadband signal. In the uplink, OBSAI broadband conversion unit 102C converts an uplink broadband signal into uplink OBSAI channelized signals.

Figure 3:
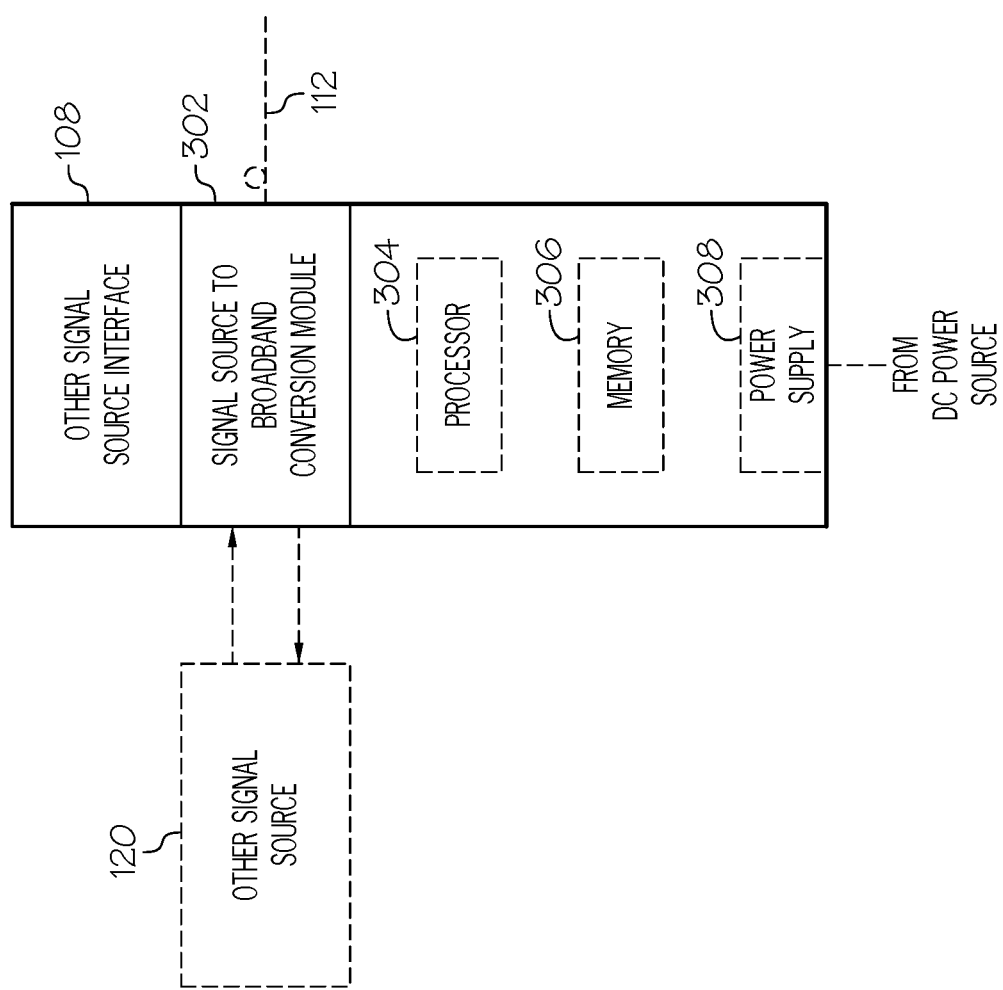
FIG. 3 is a block diagram of an exemplary embodiment of other signal source interfaces used in distributed base station radio systems, such as the exemplary distributed base station radio systems in FIGS. 1A-1B.

FIG. 3 is a block diagram of an exemplary embodiment of other signal source interface 108 used in distributed base station radio systems, such as the exemplary distributed base station radio system 100. Other signal source interface 108 includes a signal source to broadband signal conversion module 302, an optional processor 304, optional memory 306, and an optional power supply 308. In exemplary embodiments, signal source to broadband conversion module 302 is communicatively coupled to at least one other signal source 120. Signal source to broadband conversion module 302 is also communicatively coupled to at least one communication link 122. In exemplary embodiments, the communication link 122 is an optical communication link across a fiber optic cable, though it can also be other types of wired or wireless links in other embodiments. In exemplary embodiments, the signal source to broadband conversion module 302 is implemented using optional processor 304 and optional memory 306. In exemplary embodiments, the optional power supply 308 provides power to the various elements of the other signal source interface 302.

In the downlink, signal source to broadband conversion module 302 is configured to receive a downlink signal from the other signal source 120. The signal source to broadband signal conversion module 302 is further configured to convert the downlink signal to a downlink broadband signal. In exemplary embodiments, the signal source to broadband signal conversion module 302 (or another additional component) is further configured to convert the downlink broadband signal from electrical signals to optical signals for output on an optical communication link 122. In other embodiments, the downlink broadband signal is transported using a conductive communication medium, such as coaxial cable or twisted pair, and the optical conversion is not necessary. In exemplary embodiments, the signal source to broadband signal conversion module 302 (or another additional component) further converts between digital and analog signals as required.

In the uplink, signal source to broadband signal conversion module 302 is configured to receive an uplink broadband signal from communication link 122. In exemplary embodiments where communication link 122 is an optical medium, the signal source to broadband signal conversion module 302 (or another additional component) is configured to convert the uplink broadband signal between received optical signals and electrical signals. In other embodiments, the uplink broadband signal is transported using a conductive communication medium, such as coaxial cable or twisted pair, and the optical conversion is not necessary. In exemplary embodiments, the signal source to broadband signal conversion module 302 (or another additional component) further converts between digital and analog signals as required. The signal source to broadband signal conversion module 302 is further configured to convert the uplink broadband signal to at least one uplink signal. Signal source to broadband signal conversion module 302 is further configured to communicate the uplink signals to the other signal source 120.

Figure 4A:
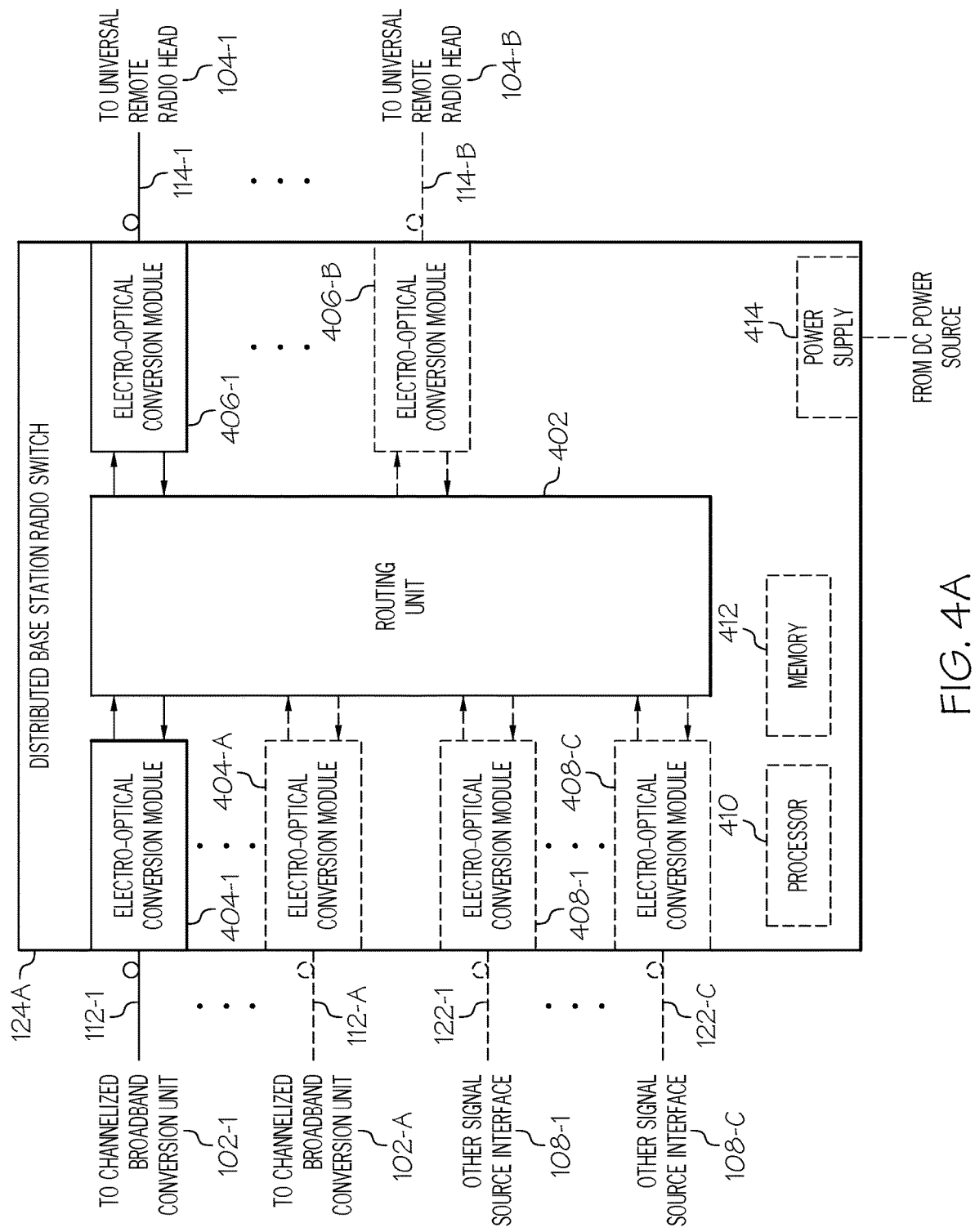
FIGS. 4A-4C are block diagrams of exemplary embodiments of distributed base station radio switches used in distributed base station radio systems, such as the exemplary distributed base station radio systems in FIGS. 1A-1B.
Figure 4B:
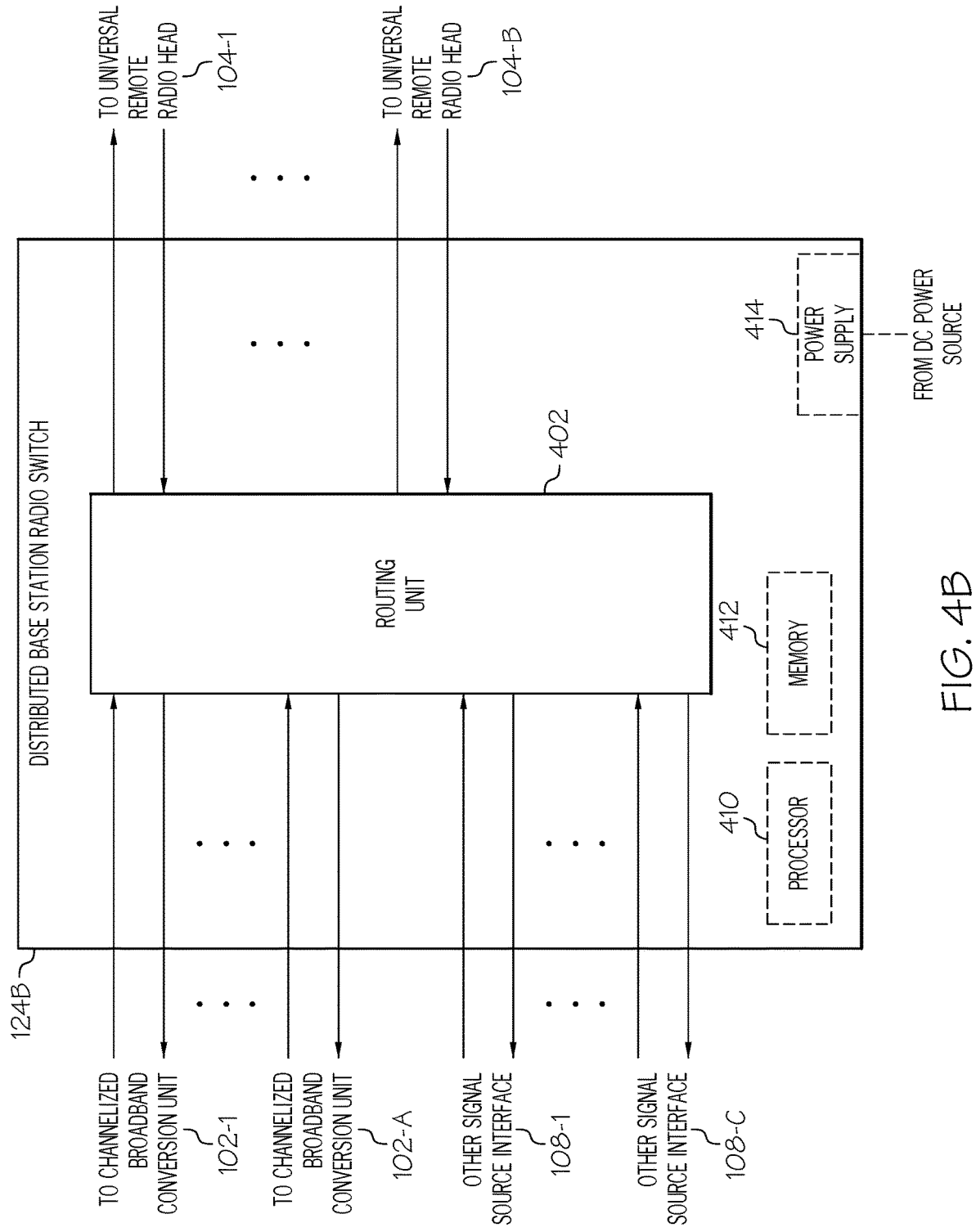
Figure 4C:
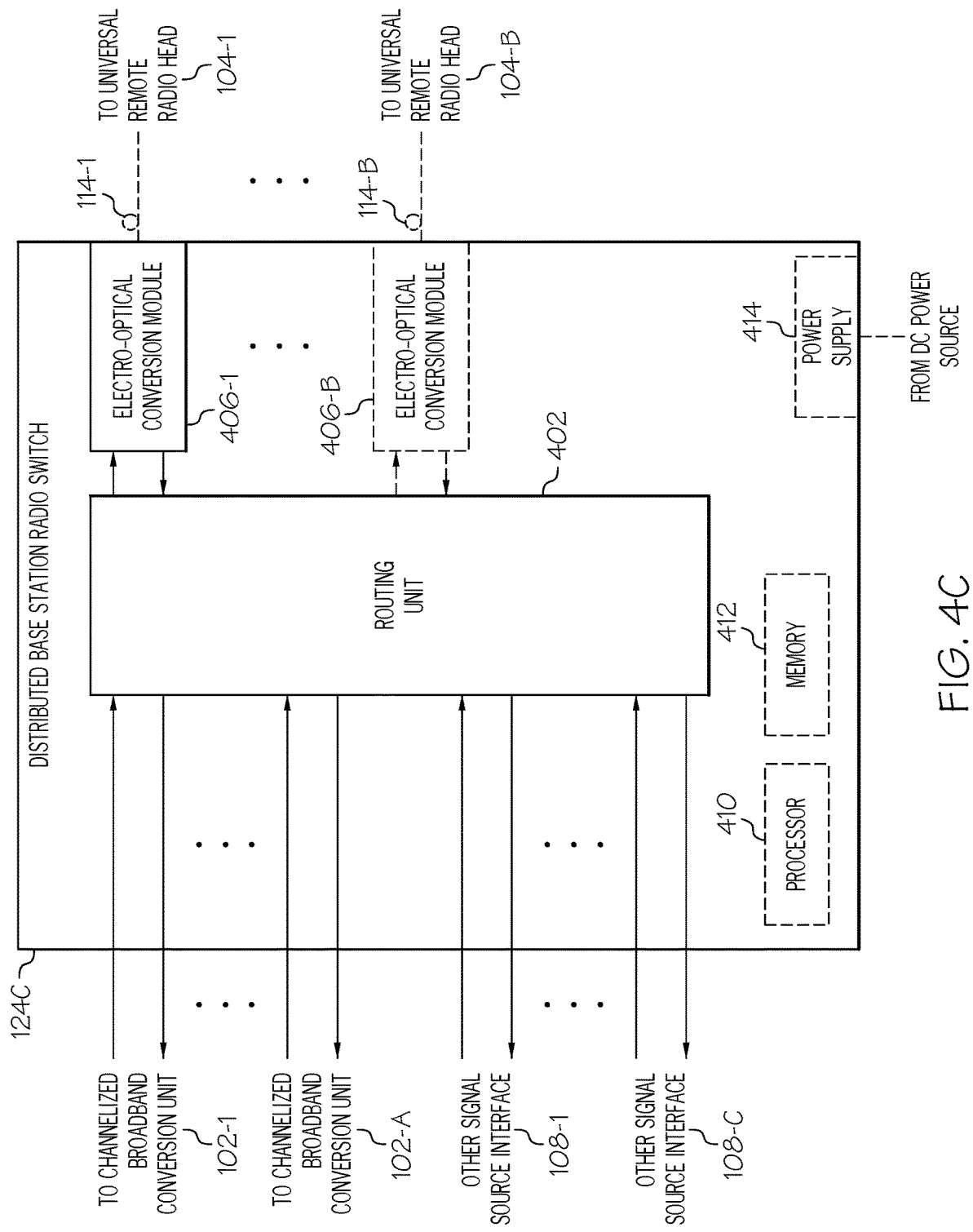

FIGS. 4A-4C are block diagrams of exemplary embodiments of distributed base station radio switch 124 used in distributed base station radio systems, such as the exemplary distributed base station radio system 100 described above. Each of FIGS. 4A-4C illustrates a different embodiment of distributed base station radio system 100, labeled distributed base station radio switch 124A-124C respectively.

FIG. 4A is a block diagram of an exemplary distributed base station radio switch 124A including a routing unit 402, at least one electro-optical conversion module 404-1 (including electro-optical conversion module 404-1 and any amount of optional electro-optical conversion modules 404 through electro-optical conversion module 404-A), at least one electro-optical conversion module 406-1 (including electro-optical conversion module 406-1 through optional electro-optical conversion module 406-B), and optional electro-optical conversion modules 408-1 (including optional electro-optical conversion module 408-1 through optional electro-optical conversion module 408-C). In exemplary embodiments, the routing unit 402 and/or at least a portion of any of electro-optical conversion modules 404, electro-optical conversion modules 406, and electro-optical conversion modules 408 are implemented using optional processor 410 and memory 412. In exemplary embodiments, the distributed base station radio switch 124A includes optional power supply 414 to power the various components of the distributed base station radio switch 124A.

Each electro-optical conversion module 404 is communicatively coupled to a channelized broadband conversion unit 102 across a communication link 112. In the forward path, each electro-optical conversion module 404 is configured to receive a downlink broadband signal from at least one channelized broadband conversion unit 102 across a communication link 112. Specifically, electro-optical conversion module 404-1 is configured to receive a downlink broadband signal from the channelized broadband conversion unit 102-1 across communication link 112-1 and optional electro-optical conversion module 404-A is configured to receive a downlink broadband signal from the optional channelized broadband conversion unit 102-A across optional communication link 112-A. Each electro-optical conversion module 404 is configured to convert the downlink broadband signal from optical to electrical signals, which are then passed onto the routing unit 402. Similarly in the reverse path, in exemplary embodiments each electro-optical conversion module 404 is configured to receive an uplink broadband signal in an electrical format from the routing unit 402 and to convert the uplink broadband signal to an optical format for communication across a communication link 112 to a channelized broadband conversion unit 102. In exemplary embodiments, the electro-optical conversion module 404 (or another additional component) further converts between digital and analog signals as required.

Each optional electro-optical conversion module 408 is communicatively coupled to an optional other signal source interface 108 across a communication link 122. In the forward path, each electro-optical conversion module 408 is configured to receive a downlink broadband signal from at least one other signal source interface 108 across a communication link 122. Specifically, optional electro-optical conversion module 408-1 is configured to receive a downlink broadband signal from the optional other signal source interface 108-1 across optional communication link 122-1 and optional electro-optical conversion module 408-C is configured to receive a downlink broadband signal from the optional other signal source interface 108-C across optional communication link 122-C. Each electro-optical conversion module 408 is configured to convert the downlink broadband signal from optical to electrical signals, which are then passed onto the routing unit 402. Similarly in the reverse path, in exemplary embodiments each electro-optical conversion module 408 is configured to receive an uplink broadband signal in an electrical format from the routing unit 402 and to convert the uplink broadband signal to an optical format for communication across a communication link 112 to an other signal source interface 108. In exemplary embodiments, the electro-optical conversion module 408 (or another additional component) further converts between digital and analog signals as required.

The routing unit 402 is communicatively coupled between at least one electro-optical conversion module 404 and optional electro-optical conversion module 408 and at least one electro-optical conversion module 406. The routing unit 402 routes downlink broadband signals and uplink broadband signals between various electro-optical conversion modules 404, electro-optical conversion modules 408, and electro-optical conversion modules 406. In the forward path, the routing unit 402 receives downlink broadband signals for at least one electro-optical conversion module 404 and any optional electro-optical conversion modules 408 and routes these downlink broadband signals to at least one electro-optical conversion module 406 (such as electro-optical conversion module 406-1) for eventual transmission to a universal remote radio head 104.

In exemplary embodiments, this routing includes aggregation of a plurality of downlink broadband signals from a plurality of electro-optical conversion modules 404 and/or electro-optical conversion modules 408 into a single downlink broadband signal that is passed to at least one electro-optical conversion module 406. In exemplary embodiments, the same or different downlink aggregate broadband signals are routed to a plurality of electro-optical conversion modules 406. In some embodiments, the routing unit 402 is configured to aggregate and route downlink broadband signals from a first subset of channelized broadband conversion units 102 and/or other signal source interfaces 108 into a first downlink aggregate broadband signal that is transferred to at least a first universal remote radio head 104-1 via electro-optical conversion module 406-1 and communication link 114-1 and is further configured to aggregate and route downlink broadband signals from a second subset of channelized broadband conversion units 102 and/or other signal source interfaces 108 into a second downlink aggregate broadband signal that is transferred to at least a second universal remote radio head 104-B via electro-optical conversion module 406-B and communication link 114-B. In exemplary embodiments, the first and second subsets partially overlap. In other exemplary embodiments, the first and second subsets are identical. In other exemplary embodiments, downlink broadband signals from greater number of subsets of channelized broadband conversion units 102 and other signal source interfaces 108 are aggregated and transferred to the universal remote radio head 104.

In exemplary embodiments, this routing includes separation of a single aggregate downlink broadband signal from a single electro-optical conversion module 404 into a plurality of downlink broadband signals that are passed to a plurality of electro-optical conversion modules 406. In exemplary embodiments, the same or different downlink broadband signals are routed to a plurality of electro-optical conversion modules 406. In some embodiments, the routing unit 402 is configured to separate and route downlink broadband signals destined for a first subset of universal remote radio heads 104 from a first downlink aggregate broadband signal received from a single channelized broadband conversion unit 102 (such as channelized broadband conversion unit 102-1) and is further configured to separate and route downlink broadband signals destined for a second subset of universal remote radio heads 104 from a second downlink aggregate broadband signal received from a second channelized broadband conversion unit 102 (such as channelized broadband conversion unit 102-A). In exemplary embodiments, the first and second subsets partially overlap. In other exemplary embodiments, the first and second subsets are identical. In other exemplary embodiments, downlink broadband signals are destined to greater number of subsets of universal remote radio heads 104.

Similarly in the reverse path, the routing unit 402 receives at least one uplink broadband signal from at least one electro-optical conversion module 406 (such as electro-optical conversion module 406-1) from a universal remote radio head 104 and routes the at least one uplink broadband signal to at least one electro-optical conversion module 404 (such as electro-optical conversion module 404-1) for eventual communication to a channelized broadband conversion unit 102. In exemplary embodiments, this routing includes aggregation of a plurality of uplink broadband signals from a plurality of electro-optical conversion modules 406 into a single uplink broadband signal that is passed to at least one electro-optical conversion module 404. In exemplary embodiments, the same or different uplink aggregate broadband signals are routed to a plurality of electro-optical conversion modules 404 and/or optional electro-optical conversion modules 408. In some embodiments, the routing unit 402 is configured to aggregate and route uplink broadband signals from a first subset of universal remote radio heads 104 into a first uplink aggregate broadband signal that is transferred to at least a first channelized broadband conversion unit 102-1 via electro-optical conversion module 404-1 and communication link 112-1 and is further configured to aggregate and route uplink broadband signals from a second subset of universal remote radio heads 104 into a second uplink aggregate broadband signal that is transferred to at least a second channelized broadband conversion unit 102-A via second electro-optical conversion module 404-A and communication link 112-A. In exemplary embodiments, the first and second subsets partially overlap. In other exemplary embodiments, the first and second subsets are identical. In other exemplary embodiments, uplink broadband signals are aggregated and/or routed from a greater number of subsets of universal remote radio heads 104.

In exemplary embodiments, this routing includes separation of a single aggregate uplink broadband signal from a single universal remote radio head 104 into a plurality of uplink broadband signals that are passed to a plurality of electro-optical conversion modules 404 and/or electro-optical conversion modules 208-1. In exemplary embodiments, the same or different uplink broadband signals are routed to a plurality of electro-optical conversion modules 404. In some embodiments, the routing unit 402 is configured to separate and route uplink broadband signals destined for a first set of channelized broadband conversion units 102 from a first aggregate uplink broadband signal received from a single universal remote radio head 104 (such as universal remote radio head 104-1) and is further configured to separate and route uplink broadband signals destined for a second subset of channelized broadband conversion units 102 from a second aggregate uplink broadband signal received from a second universal remote radio head 104 (such as universal remote radio head 104-B). In exemplary embodiments, the first and second subsets partially overlap. In other exemplary embodiments, the first and second subsets are identical. In other exemplary embodiments, uplink broadband signals are destined to greater number of subsets of channelized broadband conversion units 102 and/or other signal source interfaces 108.

In exemplary embodiments, this routing includes aggregation of a plurality of uplink broadband signals from a plurality of universal remote radio heads 104 via a plurality of electro-optical conversion modules 406 into a single aggregate uplink broadband signal that is passed to at least one channelized broadband conversion unit 102 through at least one electro-optical conversion module 404. In exemplary embodiments, the same or different uplink aggregate broadband signals are routed to a plurality of electro-optical conversion modules 406. In some embodiments, the routing unit 402 is configured to aggregate and route uplink broadband signals from a first subset of universal remote radio heads 104 into a first uplink aggregate broadband signal that is transferred to at least a first channelized broadband conversion unit 102-1 via electro-optical conversion module 404-1 and communication link 112-1 and is further configured to aggregate and route uplink broadband signals from a second subset of universal remote radio heads 104 into a second uplink aggregate broadband signal that is transferred to at least a second channelized broadband conversion unit 102-A via electro-optical conversion module 404-A and communication link 112-A. In exemplary embodiments, the first and second subsets partially overlap. In other exemplary embodiments, the first and second subsets are identical. In other exemplary embodiments, uplink broadband signals from a greater number of subsets of universal remote radio heads 104 are aggregated and transferred to channelized broadband conversion units 102 and other signal source interfaces 108.

The electrical and optical signals communicated between the channelized broadband conversion units 102, other signal source interfaces 108, universal remote radio heads 104, the distributed base station radio switch 124A, and within the distributed base station radio switch 124A can be any combination of digital and analog signals. In exemplary embodiments, these electrical signals are digital signals. In other exemplary embodiments, these electrical signals are analog signals. In other exemplary embodiments, these electrical signals include a combination of digital and analog signals. In exemplary implementations, the communication between one or more channelized broadband conversion units 102 and the distributed base station radio switch 124A is digital and the communication between the distributed base station radio switch 124A and one or more universal remote radio heads 104 is analog. In exemplary implementations, the communication between one or more channelized broadband conversion units 102 and the distributed base station radio switch 124A is analog and the communication between the distributed base station radio switch 124A and one or more universal remote radio heads 104 is digital. In exemplary implementations, the communication between a first subset of the channelized broadband conversion units 102 and/or other signal source interfaces 108 and the distributed base station radio switch 124A is digital and the communication between a second subset of the channelized broadband conversion units 102 and/or other signal source interfaces 108 and the distributed base station radio switch 124A is analog. In exemplary implementations, the communication between the distributed base station radio switch 124A and a first set of universal remote radio heads 104 is digital while the communication between the distributed base station radio switch 124A and a second set of universal remote radio heads 104 is analog. Accordingly, in exemplary embodiments the routing unit 402 includes functionality to convert between digital and analog signals as appropriate.

FIG. 4B is a block diagram of an exemplary distributed base station radio switch 124B including a routing unit 402. In exemplary embodiments, the routing unit 402 is implemented using optional processor 410 and memory 412. Exemplary distributed base station radio switch 124B includes similar components to distributed base station radio switch 124A and operates according to similar principles and methods as distributed base station radio switch 124A described above. The difference between distributed base station radio switch 124B and distributed base station radio switch 124A is that distributed base station radio switch 124B does not include any electro-optical conversion modules because the signals between the channelized broadband conversion units 102, the other signal source interfaces 108, and the universal remote radio heads 104 are communicated as electrical signals and not optical signals and do not need to be converted to and from optical signals. As described above, these electrical and optical signals can be any combination of digital and analog signals.

FIG. 4C is a block diagram of an exemplary distributed base station radio switch 124C including a routing unit 402 and at least one electro-optical conversion module 406 (including electro-optical conversion module 406-1 and any amount of optional electro-optical conversion modules 406 through electro-optical conversion module 406-B). In exemplary embodiments, the routing unit 402 and/or some portion of the functionality of at least one electro-optical conversion module 406 is implemented using optional processor 410 and memory 412. Exemplary distributed base station radio switch 124C includes similar components to distributed base station radio switch 124A and operates according to similar principles and methods as distributed base station radio switch 124A described above. The difference between distributed base station radio switch 124C and distributed base station radio switch 124A is that distributed base station radio switch 124C does not include electro-optical conversion modules 404 between the channelized broadband conversion units 102 and the routing unit 402 or the other signal source interfaces 108 and the routing unit 402 because the signals between routing unit 402, the channelized broadband conversion units 102, and the other signal source interfaces 108 are communicated as electrical signals and are not optical signals and do not need to be converted to and from optical signals. As described above, these electrical and optical signals can be any combination of digital and analog signals.

Figure 5:
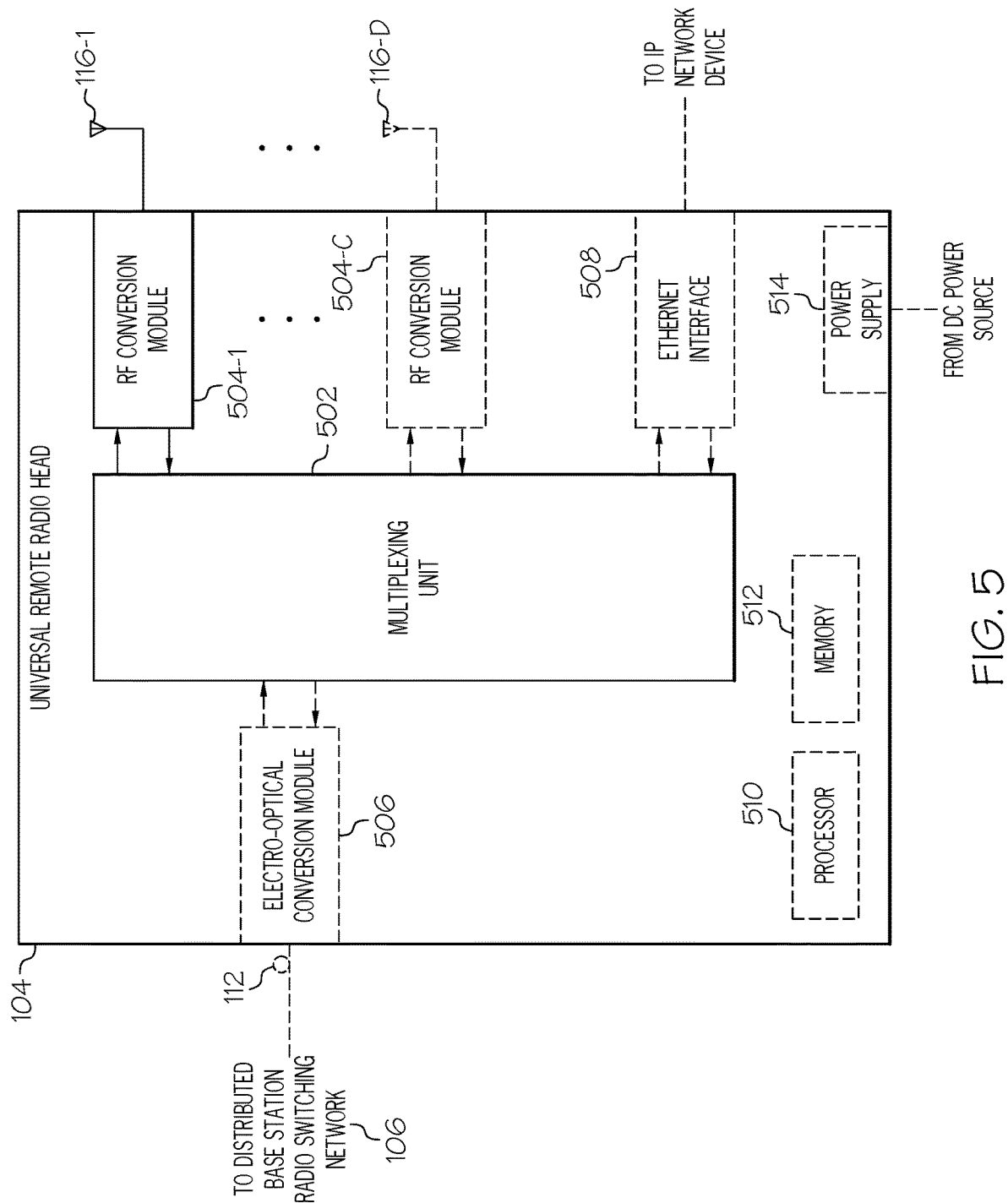
FIG. 5 is a block diagram of an exemplary embodiments of a universal remote radio head used in a distributed base station radio system, such as the exemplary distributed base station radio systems in FIGS. 1A-1B.

FIG. 5 is a block diagram of an exemplary embodiment of a universal remote radio head 104 used in a distributed base station radio system 100. The universal remote radio head 104 includes a multiplexing unit 502, at least one radio frequency (RF) conversion module 504-1 (including RF conversion module 504-1 and any amount of optional RF conversion modules 504 through optional conversion module 504-C), optional electro-optical conversion module 506, optional Ethernet interface 508, optional processor 510, optional memory 512, and optional power supply 514. In exemplary embodiments, multiplexing unit 502, at least one RF conversion module 504, optional electro-optical conversion module 506, and/or optional Ethernet interface 508 are implemented at least in part by optional processor 510 and memory 512 of universal remote radio head 104. In exemplary embodiments, the optional power supply 514 powers the various components of universal remote radio head 105.

The optional electro-optical conversion module 506 is communicatively coupled to the universal remote radio head switching network 106 across a communication link 114. In the forward path, the optional electro-optical conversion module 506 is configured to receive a downlink broadband signal from the distributed base station radio switching network 106 and/or the distributed base station radio switch 124 across a communication link 114. The optional electro-optical conversion module 506 is configured to convert the downlink broadband signal from optical to electrical format, which is then passed onto the multiplexing unit 502. Similarly, in the reverse path, in exemplary embodiments the optional electro-optical conversion module 506 is configured to receive an uplink broadband signal from the multiplexing unit 502. The optional electro-optical conversion module 506 is further configured to convert the uplink broadband signal from electrical to optical format, which is then passed onto the distributed base station radio switching network 106 and/or the distributed base station radio switch 124 across the communication link 114. In exemplary embodiments, more than one electro-optical conversion module 506 is coupled across more than one communication link 114 to the same distributed base station radio switch 124, an intermediary device, and/or another distributed base station radio switch 124. In exemplary embodiments that do not include the electro-optical conversion module 506, the signals communicated between the universal remote radio head 104 and the distributed base station radio switching network 106 and/or the distributed base station radio switch 124 are electrical signals and do not require any conversion between optical and electrical. In exemplary embodiments, the electro-optical conversion module 506 (or another additional component) further converts between digital and analog signals as required.

The multiplexing unit 502 is communicatively coupled between the electro-optical conversion module 506 and/or the distributed base station radio switching network 106 and the at least one RF conversion module 504 and the optional Ethernet interface 508. In the forward path, the multiplexing unit 502 is configured to receive a downlink broadband signal from the distributed base station radio switching network 106 and/or a distributed base station radio switch 124 directly or via the optional electro-optical conversion module 506. In exemplary embodiments, the multiplexing unit 502 simulcasts the broadband signal to each RF conversion module 504. In other embodiments, the multiplexing unit 502 splits apart individual downlink broadband signals from a downlink aggregate broadband signal and passes them to a plurality of RF conversion modules 504. In exemplary embodiments, one of the downlink broadband signals communicated to one of the RF conversion modules 504 pertains to a first mobile access band and/or technology while another downlink broadband signal communicated to another one of the RF conversion modules 504 pertains to a second mobile access band and/or technology. In exemplary embodiments, the multiplexing unit 502 splits off a signal and communicates it to the Ethernet interface 508. In exemplary embodiments, other types of data are carried in the downlink broadband signals.

Similarly in the reverse path, the multiplexing unit 502 is configured to receive upstream signals from various radio frequency (RF) conversion modules 504 and is further configured to multiplex a plurality of upstream signals into a single uplink broadband signal. In exemplary embodiments, the multiplexing unit 502 is configured to aggregate a plurality of upstream signals from various radio frequency (RF) conversion modules 504 into a single uplink broadband signal. The multiplexing unit 502 is further configured to communicate the uplink broadband signal to distributed base station radio switching network 106 and/or the distributed base station radio switch 124 directly or via the optional electro-optical conversion module 506.

Each RF conversion module 504 is communicatively coupled to the multiplexing unit 502 and is coupled to and/or includes at least one antenna 116. Each RF conversion module 504 is configured to convert between at least one downlink broadband signal and radio frequency signals in at least one radio frequency band. Each RF conversion module is configured to communicate radio frequency signals in the at least one radio frequency band across an air medium with at least one subscriber using at least one antenna 116.

In the downstream, each RF conversion module 504 is configured to convert at least one downlink signal into a downlink radio frequency (RF) signal in a radio frequency band. In exemplary embodiments, this may include digital to analog converters and oscillators. Each RF conversion module 504 is further configured to transmit the downlink radio frequency signals in the radio frequency band to at least one subscriber unit 118 using at least one antenna 116. In a specific embodiment, radio frequency conversion module 504-1 is configured to convert at least one downlink broadband signal into a downlink radio frequency signal in a radio frequency band. Each RF conversion module 504 is further configured to transmit the downlink radio frequency signal in a radio frequency band using a radio frequency antenna 116-1 to at least one wireless subscriber unit. In exemplary embodiments, radio frequency conversion module 504-1 is configured to convert a first downlink signal into a first downlink radio frequency signal in a first radio frequency band and to transmit the first downlink radio frequency signal in the first radio frequency band to at least one wireless subscriber using the antenna 116-1. Similarly, radio frequency conversion module 504-2 is configured to convert a second downlink broadband signal into a second downlink radio frequency signal in a second radio frequency band and to transmit the second downlink radio frequency signal in the second radio frequency band to at least one wireless subscriber unit 118 using the antenna 116-2. In exemplary embodiments, one radio frequency conversion module 504-1 and antenna 116-1 pair transports to a first set of wireless subscriber units 118 in a first band and another radio frequency conversion module 504-C and antenna 116-C pair transports to a second set of wireless subscriber units 118 in a second band. Other combinations of radio frequency conversion module 504 and antenna 116 pairs are used to communicate other combinations of radio frequency signals in other various radio frequency bands to various subscriber units 118, such as but not limited to MIMO or carrier aggregation where signals from multiple antennas go to a single subscriber unit 118.

Similarly in the reverse path, in exemplary embodiments each RF conversion module 504 is configured to receive uplink radio frequency signals from at least one subscriber unit 118 using at least one radio frequency antenna 116. Each radio frequency conversion module 504 is further configured to convert the radio frequency signals to at least one uplink broadband signal. Each radio frequency conversion module 504 is further configured to communicate the uplink broadband signal to the broadband signal multiplexing unit 502.

FIGS. 6A-6E are block diagrams of exemplary embodiments of radio frequency (RF) conversion modules of remote antenna units 106 used in distributed antenna systems, such as exemplary distributed antenna system 100 described above. Each of FIGS. 6A-6E illustrates a different embodiment of RF conversion module 504, labeled RF conversion module 504A-504E respectively.

Figure 6A:
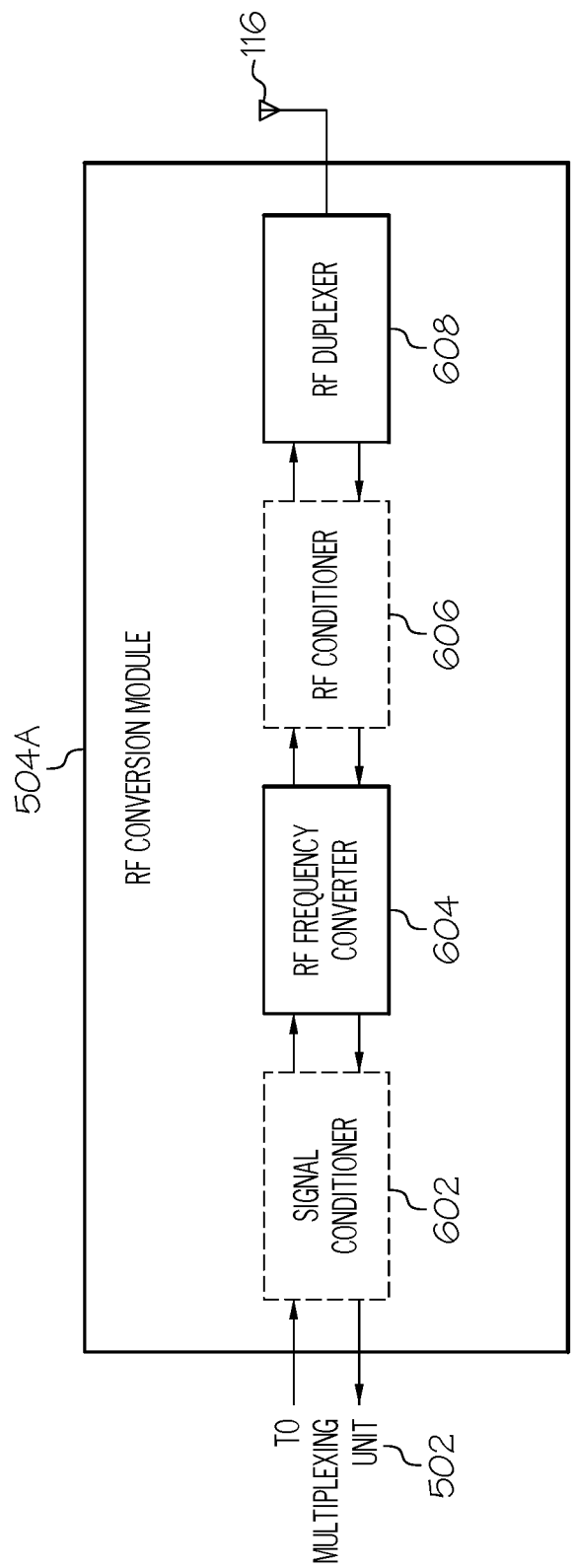
FIGS. 6A-6E are block diagrams of exemplary embodiments of radio frequency (RF) conversion modules used in universal remote radio heads of distributed base station radio systems, such as the exemplary distributed base station radio systems in FIGS. 1A-1B.

FIG. 6A is a block diagram of an exemplary RF conversion module 504A including an optional signal stream conditioner 602, an RF frequency converter 604, an optional RF conditioner 606, and an RF duplexer 608 coupled to a single antenna 116.

The optional signal conditioner 602 is communicatively coupled to a multiplexing unit 502 and the radio frequency (RF) converter 604. In the forward path, the optional signal conditioner 602 conditions the downlink broadband signal (for example, through amplification, attenuation, and filtering) received from the remote multiplexing unit 502 and passes the downlink signal to the RF converter 604. In the reverse path, the optional signal conditioner 602 conditions the uplink broadband signal (for example, through amplification, attenuation, and filtering) received from the RF converter 604 and passes the uplink broadband signal to the remote multiplexing unit 502.

The RF converter 604 is communicatively coupled to either the multiplexing unit 502 or the optional signal conditioner 602 on one side and to either RF duplexer 608 or the optional RF conditioner 606 on the other side. In the downstream, the RF converter 604 converts a downlink broadband signal to downlink radio frequency (RF) signals and passes the downlink RF signals onto either the RF duplexer 608 or the optional RF conditioner 606. In the upstream, the RF converter 604 converts uplink radio frequency (RF) signals received from either the RF duplexer 608 or the optional RF conditioner 606 to an uplink broadband signal and passes the uplink broadband signal to either the multiplexing unit 502 or the optional signal conditioner 602.

The optional RF conditioner 606 is communicatively coupled between the RF converter 604 and the RF duplexer 608. In exemplary embodiments, the RF conditioner 606 performs gain adjustment and filtering on the downstream and upstream RF signals.

The RF duplexer 608 is communicatively coupled to either the RF frequency converter 604 or the optional RF conditioner 606 on one side and the antenna 116 on the other side. The RF duplexer 608 duplexes the downlink RF signals with the uplink RF signals for transmission/reception using the antenna 116.

Figure 6B:
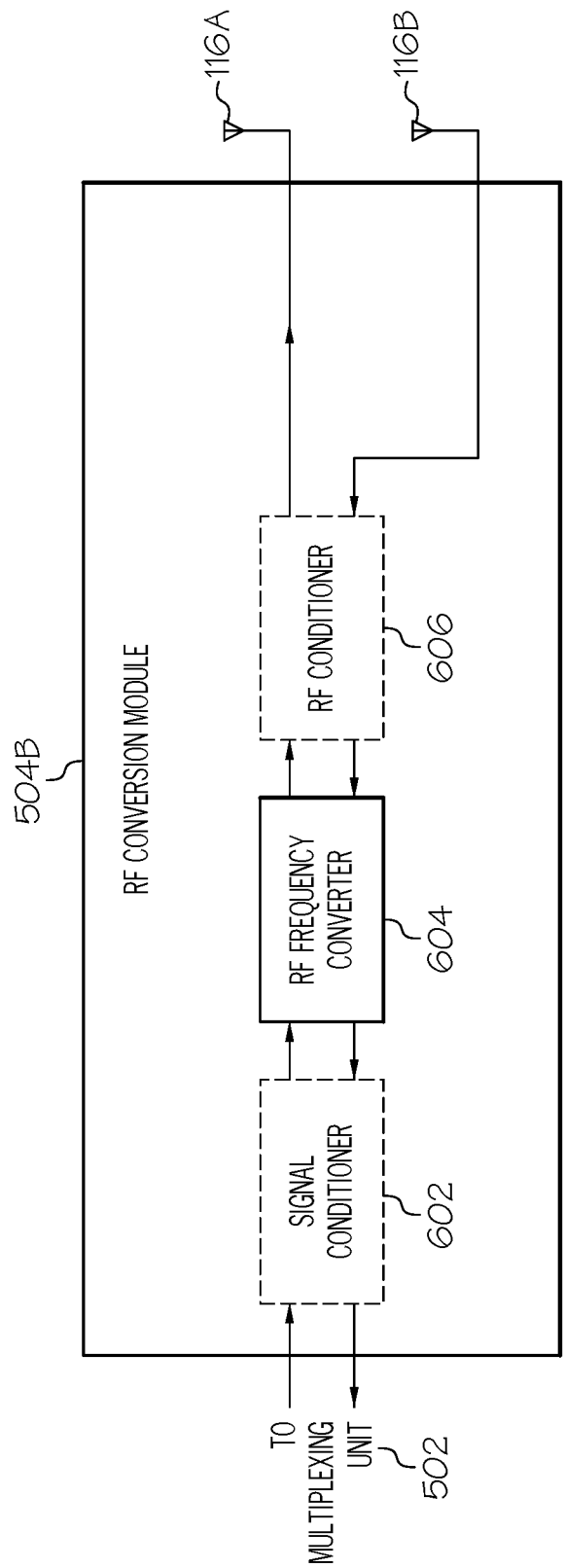

FIG. 6B is a block diagram of an exemplary RF conversion module 504B including an optional signal conditioner 602, an RF frequency converter 604, an optional RF conditioner 606 coupled to a downlink antenna 116A and an uplink antenna 116B. RF conversion module 504B includes similar components to RF conversion module 504A and operates according to similar principles and methods as RF conversion module 504A described above. The difference between RF conversion module 504B and RF conversion module 504A is that RF conversion module 504B does not include RF duplexer 608 and instead includes separate downlink antenna 116A used to transmit RF signals to at least one subscriber unit 118 and uplink antenna 116B used to receive RF signals from at least one subscriber unit 118.

Figure 6C:
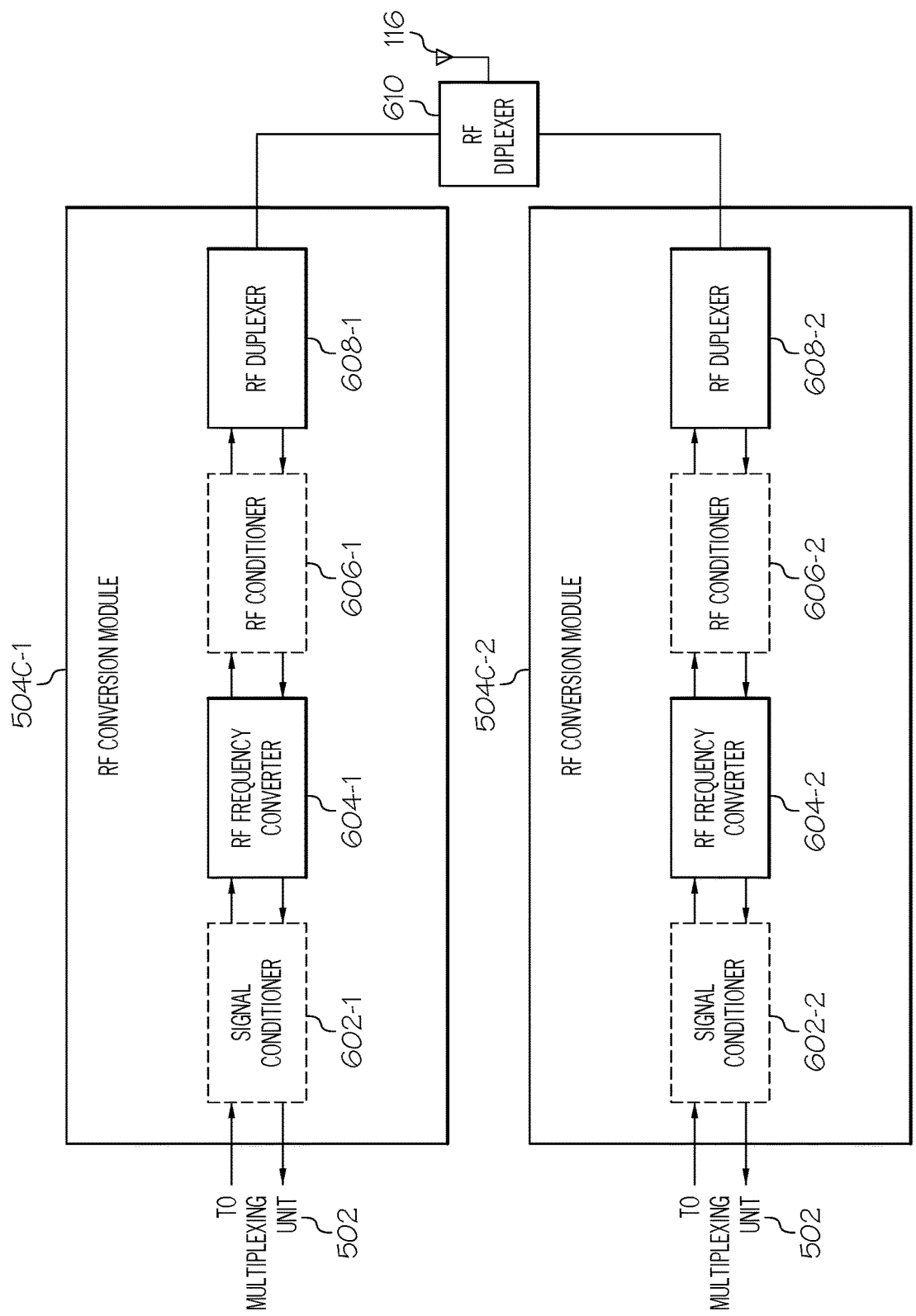

FIG. 6C is a block diagram of an exemplary RF conversion module 504C-1 and exemplary RF conversion module 504C-2 that share a single antenna 116 through an RF diplexer 610. The RF conversion module 504C-1 includes an optional signal conditioner 602-1 an RF frequency converter 604-1, an optional RF conditioner 606-1, and an RF duplexer 608-1 communicatively coupled to RF diplexer 610 that is communicatively coupled to antenna 116. Similarly, the RF conversion module 504C-2 includes an optional signal conditioner 602-2, an RF frequency converter 604-2, an optional RF conditioner 606-2, and an RF duplexer 608-2 communicatively coupled to RF diplexer 610 that is communicatively coupled to antenna 116. Each of RF conversion module 504C-1 and 504C-2 operate according to similar principles and methods as RF conversion module 504A described above. The difference between RF conversion modules 504C-1 and 504C-2 and RF conversion module 504A is that RF conversion modules 504C-1 and 504C-2 are both coupled to a single antenna 116 through RF diplexer 610. The RF diplexer 610 diplexes the duplexed downlink and uplink signals for both RF conversion module 504C-1 and 504C-2 for transmission/reception using the single antenna 116.

Figure 6D:
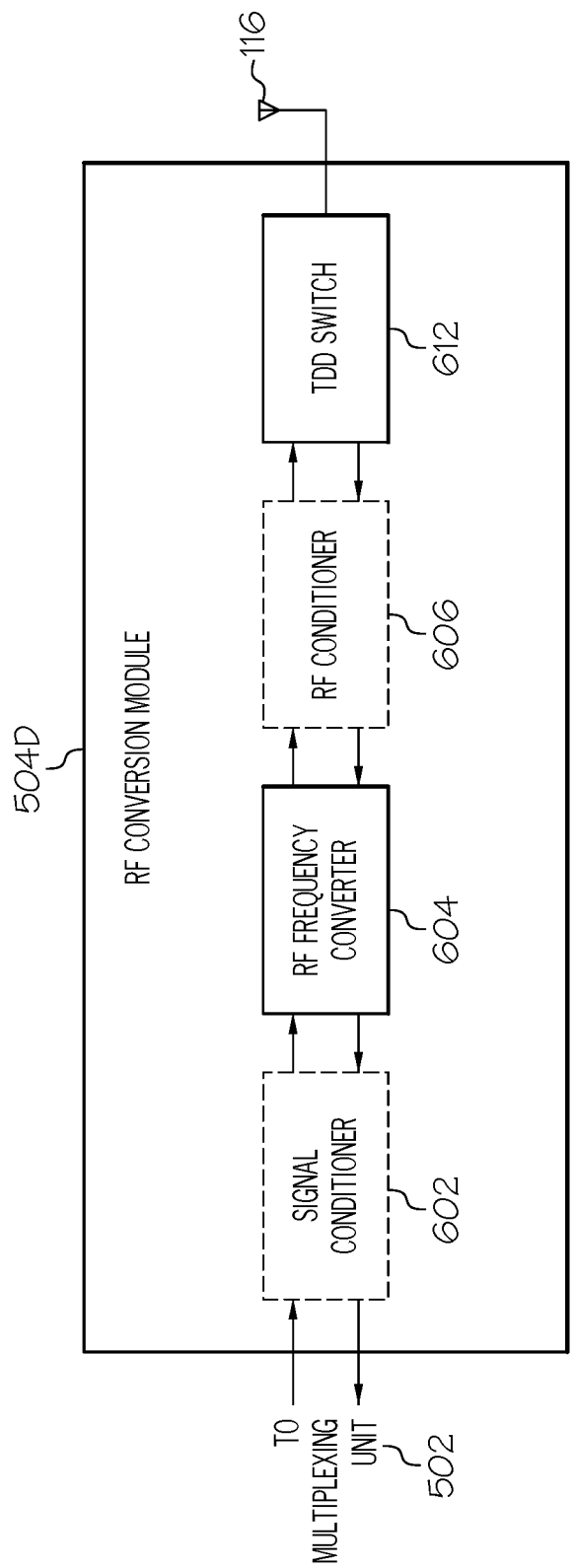

FIG. 6D is a block diagram of an exemplary RF conversion module 504D including an optional signal conditioner 602, an RF frequency converter 604, an optional RF conditioner 606, and a time division duplexing (TDD) switch 612 coupled to an antenna 116. RF conversion module 504D includes similar components to RF conversion module 504A and operates according to similar principles and methods as RF conversion module 504A described above. The difference between RF conversion module 504D and RF conversion module 504A is that RF conversion module 504D does not include RF duplexer 608 and instead includes the TDD switch 612 that allows the RF conversion module 504D to switch between transmit and receive modes at different times based on a TDD signal that can be supplied from other components in the system.

Figure 6E:
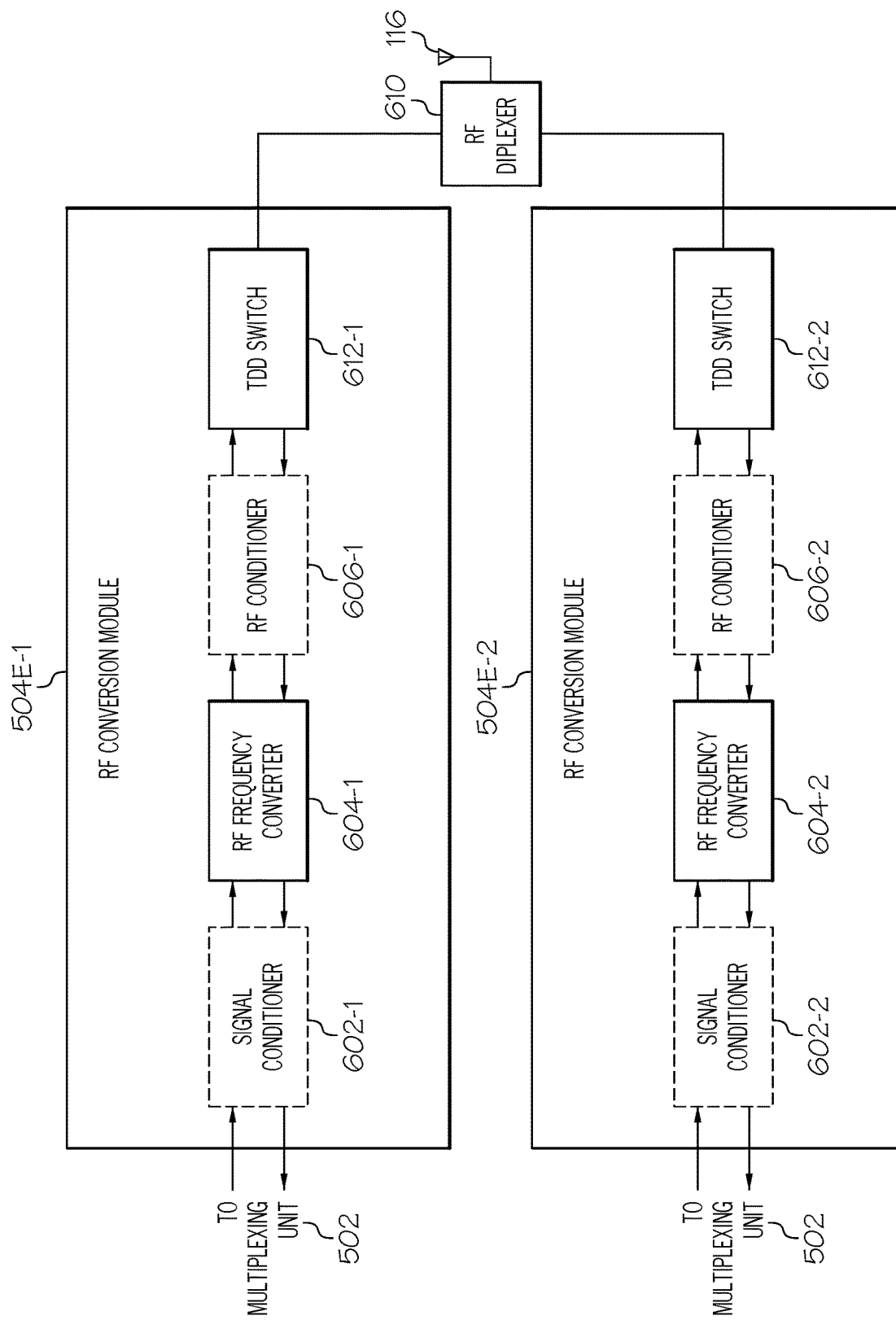

FIG. 6E is a block diagram of an exemplary RF conversion module 504E-1 and exemplary RF conversion module 504E-2 that share a single antenna 116 through an RF diplexer 610. The RF conversion module 504E-1 includes an optional signal conditioner 602-1, an RF frequency converter 604-1, an optional RF conditioner 606-1, and a TDD switch 612-1 communicatively coupled to RF diplexer 610 that is communicatively coupled to antenna 116. Similarly, the RF conversion module 504E-2 includes an optional signal conditioner 602-2, an RF frequency converter 604-2, an optional RF conditioner 606-2, and a TDD switch 612-2 communicatively coupled to RF diplexer 610 that is communicatively coupled to antenna 116. Each of RF conversion module 504E-1 and 504E-2 operate according to similar principles and methods as RF conversion modules 504C-1 and 504C-2 described above. The difference between RF conversion modules 504E-1 and 504E-2 and RF conversion modules 504C-1 and 504C-2 is that RF conversion modules 504E-1 and 504E-2 do not include RF duplexers 608-1 and 608-2 and instead include TDD switches 612-1 and 612-2 that allow the RF conversion modules 504E-1 and 504E-2 to switch between transmit and receive modes based on TDD signals that can be supplied from other components in the system.

Figure 7:
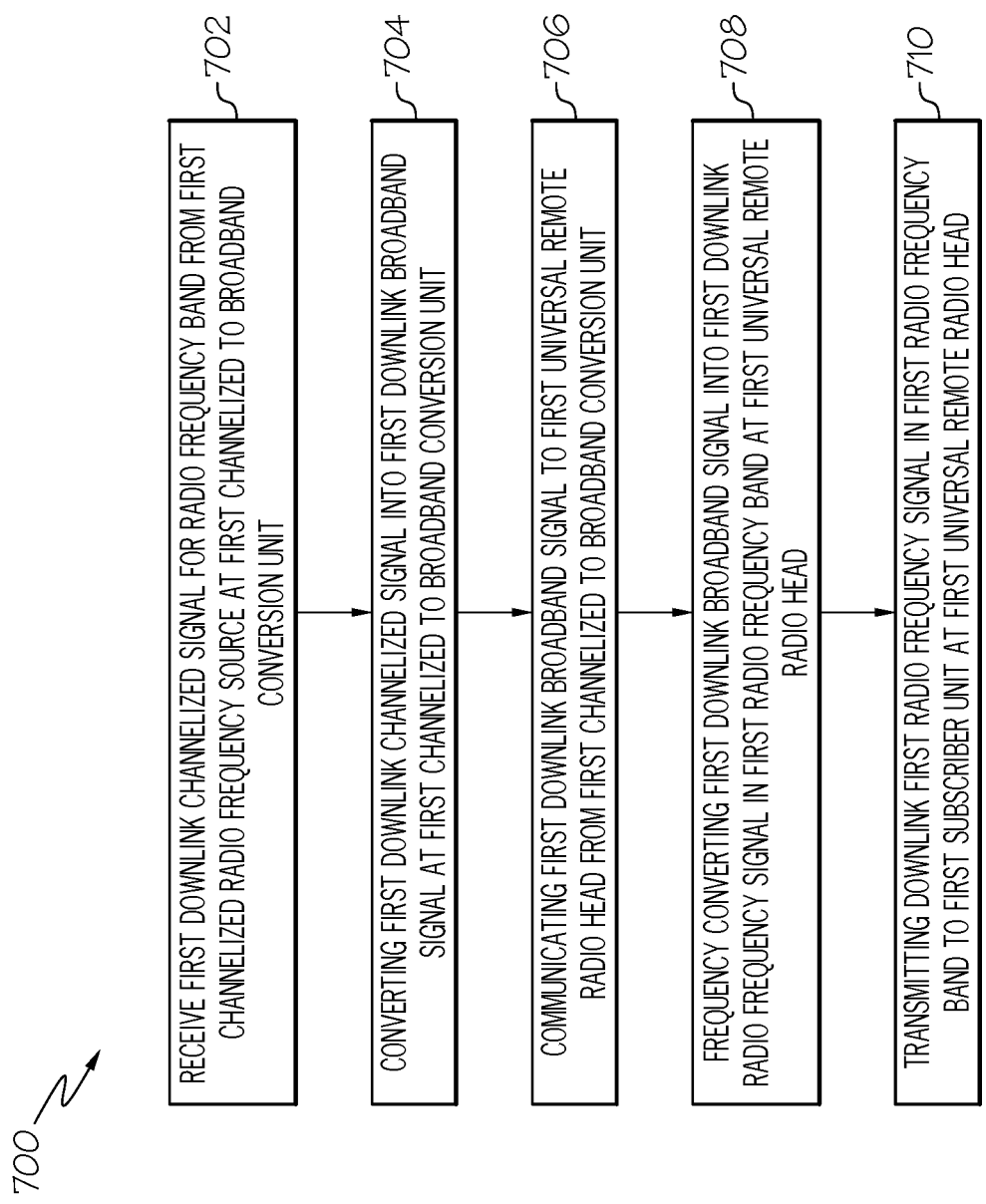
FIG. 7 is a flow diagram illustrating one exemplary embodiment of a method of operating a distributed base station radio system.

FIG. 7 is a flow diagram illustrating an exemplary embodiment of a method 700 of operating a distributed base station radio system. Exemplary method 700 begins at block 702 with receiving a first downlink channelized signal for a first radio frequency band from a first channelized radio frequency source at a first channelized to broadband conversion unit. In exemplary embodiments, the channelized radio frequency source is a base band unit of a wireless access base station. In exemplary embodiments, the first channelized radio frequency source is at least one of a Common Public Radio Interface (CPRI) base station interface and an Open Base Station Architecture Initiative (OBSAI) base station interface. In exemplary embodiments, the first downlink channelized data is formatted according to at least one of a Common Public Radio Interface (CPRI) standard and an Open Base Station Architecture Initiative (OBSAI) standard. Exemplary method 700 proceeds to block 704 with converting the first downlink channelized signal into a first downlink broadband signal at the first channelized to broadband conversion unit. Exemplary method 700 proceeds to block 706 with communicating the first downlink broadband signal to a first universal remote radio head from the first channelized to broadband conversion unit 706. Exemplary method 700 proceeds to block 708 with frequency converting the first downlink broadband signal into a first downlink radio frequency signal at the first universal remote radio head. Exemplary method 700 proceeds to block 710 with transmitting a first downlink radio frequency signal in the first radio frequency band to a first subscriber unit at the first universal remote radio head.

In exemplary embodiments, the method 700 further includes receiving second downlink channelized data for a second radio frequency band from a second channelized radio frequency source at a second channelized to broadband conversion unit. In exemplary embodiments, the method 700 further includes receiving the first downlink broadband signal from the first channelized to broadband conversion unit at a switch; receiving the second downlink broadband signal from the second channelized to broadband conversion unit at the switch; aggregating the first downlink broadband signal with the second downlink broadband signal into an aggregate downlink broadband signal; and communicating the aggregate downlink broadband signal from the switch to the first universal remote radio head.

In exemplary embodiments, the method 700 further includes extracting the first downlink broadband signal from the aggregate downlink broadband signal at the first universal remote radio head.

In exemplary embodiments, the method 700 further includes receiving second downlink channelized data for a second radio frequency band from a second channelized radio frequency source at a second channelized to broadband conversion unit; converting the second downlink channelized data into a second downlink broadband signal; communicating the second downlink broadband signal to the first universal remote radio head from the second channelized to broadband conversion unit; frequency converting the second downlink broadband signal into second downlink radio frequency signals in the second radio frequency band at the first universal remote radio head; and transmitting the second downlink radio frequency signals in the second radio frequency band to at least one subscriber unit at the first universal remote radio head.

In implementations, frequency converting the first downlink broadband signal into first downlink radio frequency signals in the first radio frequency band occurs at a first frequency converter of the first universal remote radio head; frequency converting the second downlink broadband signal into second downlink radio frequency signals in the second radio frequency band occurs at a second frequency converter of the first universal remote radio head; transmitting the first downlink radio frequency signals in the first radio frequency band to a first subscriber unit at the first universal remote radio head occurs at a first power amplifier, radio frequency transceiver, and antenna set of the first universal remote radio head; and transmitting the second downlink radio frequency signals in the second radio frequency band to at least one subscriber unit at the first universal remote radio head occurs at a second power amplifier, radio frequency transceiver, and antenna set of the first universal remote radio head.

In implementations, frequency converting the first downlink broadband signal into first downlink radio frequency signals in the first radio frequency band occurs at a first frequency converter of the first universal remote radio head; frequency converting the second downlink broadband signal into second downlink radio frequency signals in the second radio frequency band occurs at a second frequency converter of the first universal remote radio head; and transmitting both the first downlink radio frequency signals in the first radio frequency band and the second downlink radio frequency signals in the second radio frequency band occurs at a single power amplifier, radio frequency transceiver, and antenna set.

In implementations, frequency converting both the first downlink broadband signal into the first downlink radio frequency signals in the first radio frequency band and the second downlink broadband signals into the second downlink radio frequency signals in the second radio frequency band occurs at a single radio frequency converter; and transmitting both the first downlink radio frequency signals in the first radio frequency band and the second downlink radio frequency signals in the second radio frequency band occurs at a single power amplifier, radio frequency transceiver, and antenna set.

In exemplary embodiments, the method 700 further includes receiving second downlink channelized data for a second radio frequency band from a second channelized radio frequency source at a second channelized to broadband conversion unit; converting the second downlink channelized data into a second downlink broadband signal; communicating the second downlink broadband signal to a second universal remote radio head from the second channelized to broadband conversion unit; frequency converting the second downlink broadband signal into second downlink radio frequency signals in the second radio frequency band at the second universal remote radio head; and transmitting the second downlink radio frequency signals in the second radio frequency band to at least one subscriber unit at the second universal remote radio head.

Figure 8:
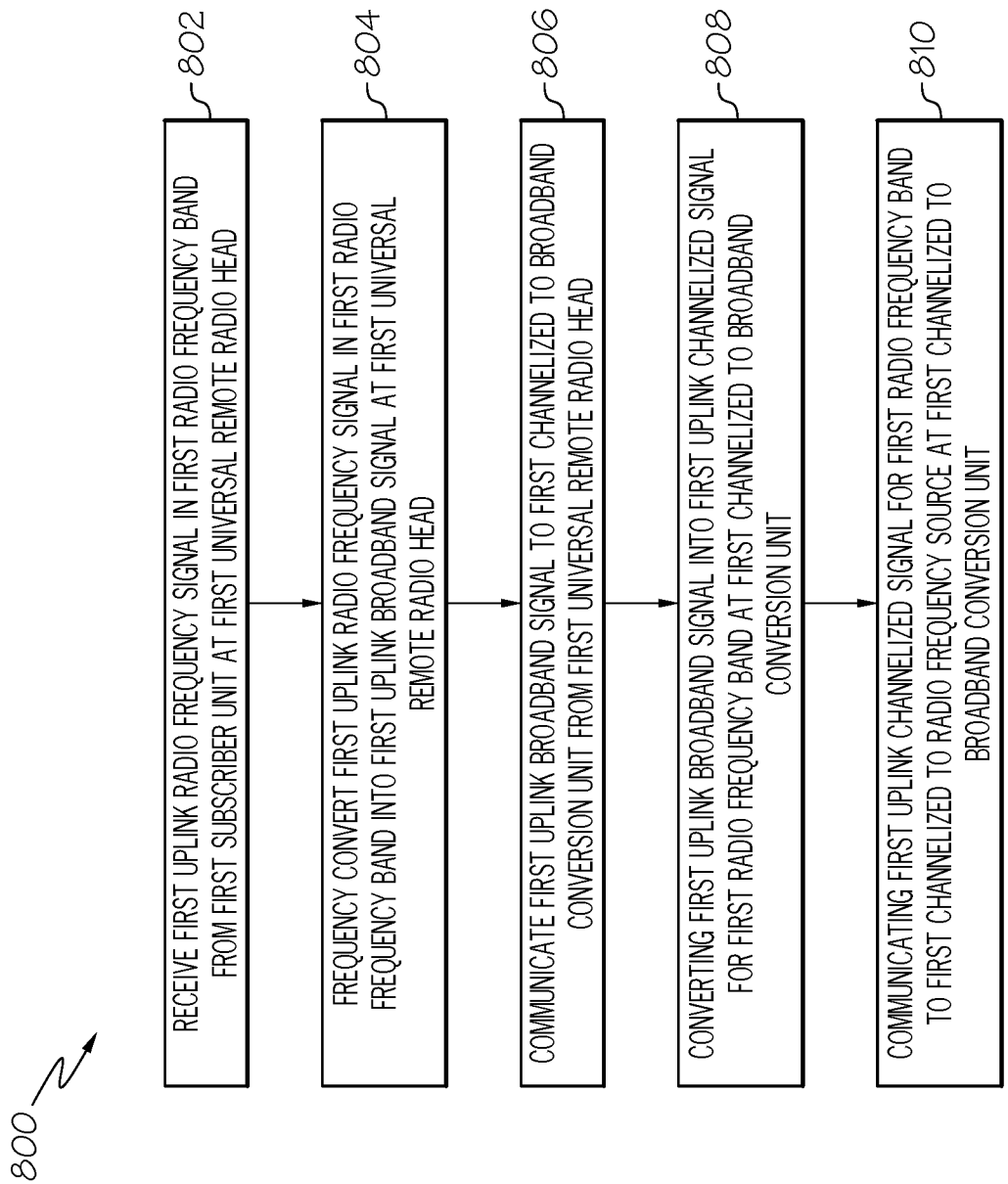
FIG. 8 is a flow diagram illustrating another exemplary embodiment of a method of operating a distributed base station radio system.

FIG. 8 is a flow diagram illustrating an exemplary embodiment of a method 800 of operating a distributed base station radio system. Exemplary method 800 begins at block 802 with receiving a first uplink radio frequency signal in a first radio frequency band from a first subscriber unit at a first universal remote radio head. Exemplary method 800 proceeds to block 804 with frequency converting the first uplink radio frequency signal in the first radio frequency band into a first uplink broadband signal at a first universal remote radio head 804. Exemplary method 800 proceeds to block 806 with communicating the first uplink broadband signal to a first channelized to broadband conversion unit from the first universal remote radio head. Exemplary method 800 proceeds to block 808 with converting the first uplink broadband signal into a first uplink channelized signal for the first radio frequency band at the first channelized to broadband conversion unit 808. Exemplary method 800 proceeds to block 810 with communicating the first uplink channelized signal for the first radio frequency band to the first channelized radio frequency source at the first channelized to broadband conversion unit.

Figure 9:
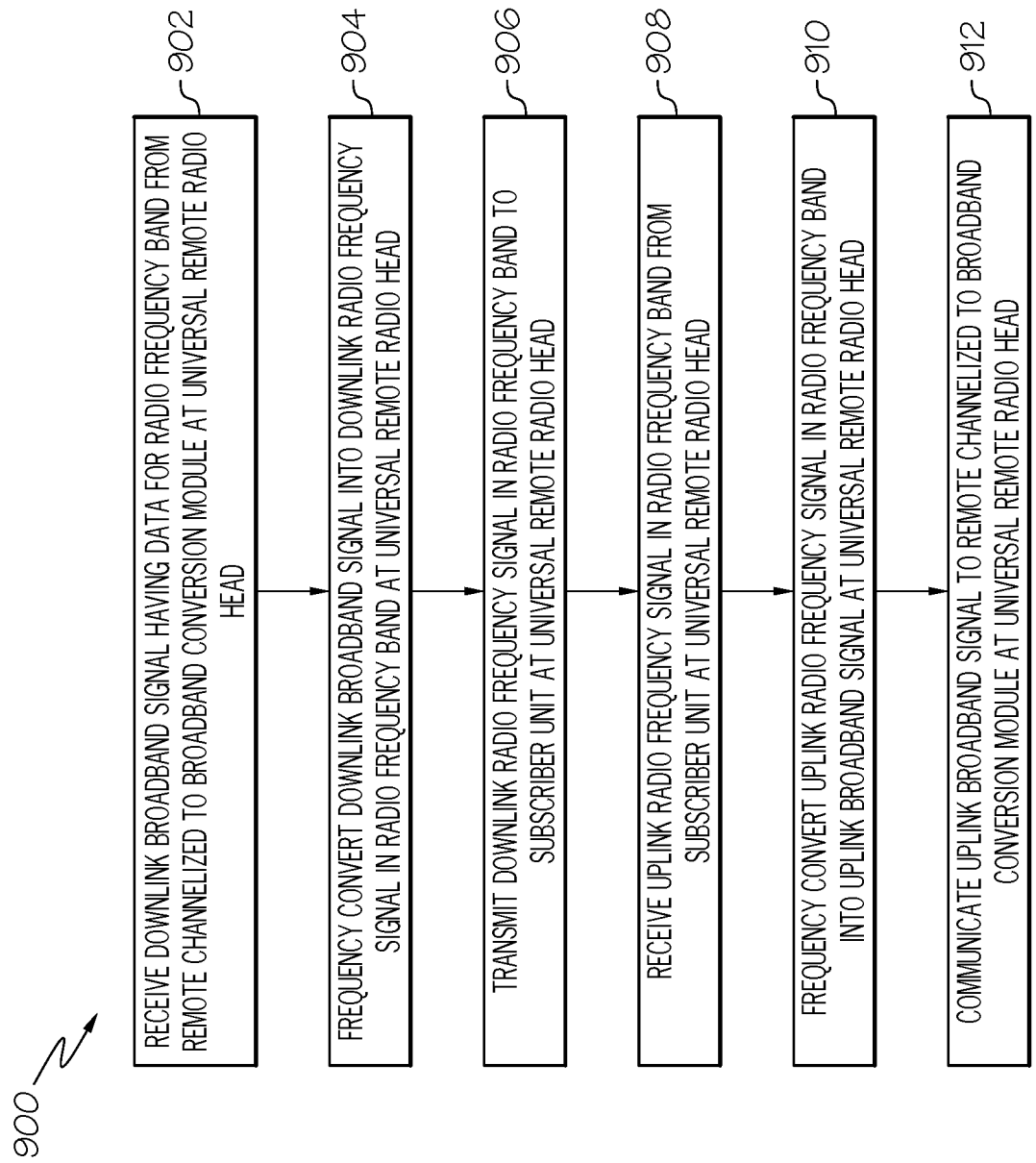
FIG. 9 is flow diagram illustrating another exemplary embodiment of a method of operating a universal remote radio head.

FIG. 9 is a flow diagram illustrating an exemplary embodiment of a method 900 of operating a universal remote radio head. Exemplary method 900 begins at block 902 with receiving a downlink broadband signal having data for a radio frequency band from a remote channelized to broadband conversion module at the universal remote radio head. Exemplary method 900 proceeds to block 904 with frequency converting the downlink broadband signal into a downlink radio frequency signal in the radio frequency band at the universal remote radio head. Exemplary method 900 proceeds to block 906 with transmitting the downlink radio frequency signal in the radio frequency band to a subscriber unit at the universal remote radio head. Exemplary method 900 proceeds to block 908 with receiving an uplink radio frequency signal in the radio frequency band from the subscriber unit at the universal remote radio head. Exemplary method 900 proceeds to block 910 with frequency converting the uplink radio frequency signal in the radio frequency band into an uplink broadband signal at the universal remote radio head. Exemplary method 900 proceeds to block 912 with communicating the uplink broadband signal to the remote channelized to broadband conversion module at the universal remote radio head.

Figure 10:
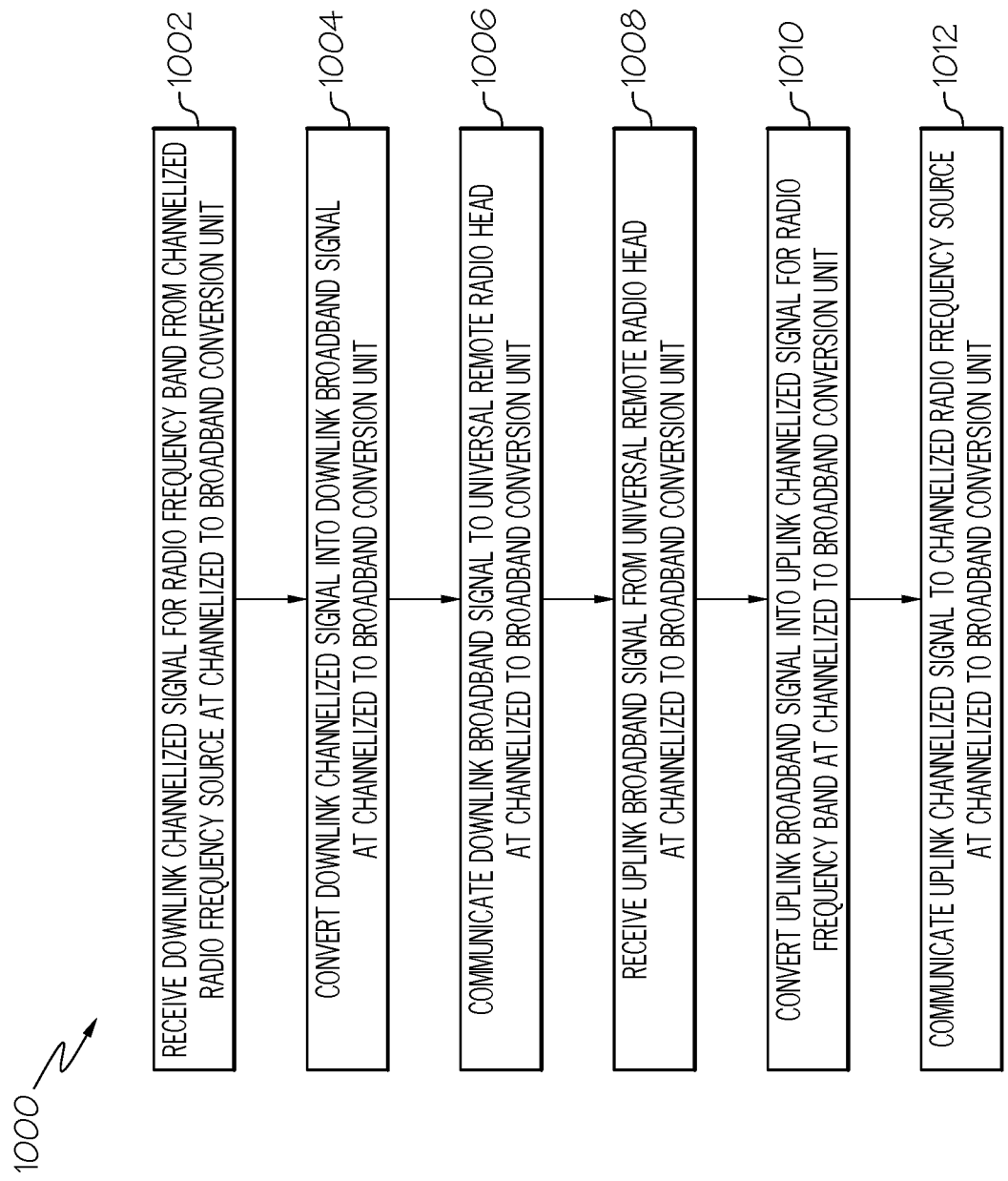
FIG. 10 is a flow diagram illustrating another exemplary embodiment of a method of operating a channelized broadband conversion unit.

FIG. 10 is a flow diagram illustrating an exemplary embodiment of a method 1000 of operating a channelized to broadband conversion unit. Exemplary method 1000 begins at block 1002 with receiving a downlink channelized signal for a radio frequency band from a channelized radio frequency source at a channelized to broadband conversion unit. In exemplary embodiments, the channelized radio frequency source is a base band unit of a wireless access base station. In exemplary embodiments, the first channelized radio frequency source is at least one of a Common Public Radio Interface (CPRI) base station interface, an Open Base Station Architecture Initiative (OBSAI) base station interface, and an Open Radio Interface (ORI) base station interface. In exemplary embodiments, the first downlink channelized data is formatted according to at least one of a Common Public Radio Interface (CPRI) standard, an Open Base Station Architecture Initiative (OBSAI) standard, and a Open Radio Interface (ORI) standard. Exemplary method 1000 proceeds to block 1004 with converting the downlink channelized signal into a downlink broadband signal at the channelized to broadband conversion unit. Exemplary method 1000 proceeds to block 1006 with communicating the downlink broadband signal to a universal remote radio head at the channelized to broadband conversion unit. Exemplary method 1000 proceeds to block 1008 with receiving an uplink broadband signal from the universal remote radio head at the channelized to broadband conversion unit. Exemplary method 1000 proceeds to block 1010 with converting the uplink broadband signal into an uplink channelized signal for the radio frequency band at the channelized to broadband conversion unit. Exemplary method 1000 proceeds to block 1012 with communicating the uplink channelized signal to the channelized radio frequency source at the channelized to broadband conversion unit.

Embodiments of processors described herein (such as any of processor 204, processor 304, processor 410, and processor 510 described above) include or function with software programs, firmware or other computer readable instructions for carrying out various methods, process tasks, calculations, and control functions, used in the components of the systems described above.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAIVIBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a distributed base station radio system comprising: a first channelized to broadband conversion unit configured to receive first downlink channelized data for a first radio frequency band from a first channelized radio frequency source; wherein the first channelized to broadband conversion unit is further configured to convert the first downlink channelized data into a first downlink broadband signal; a first universal remote radio head communicatively coupled to the first channelized to broadband conversion unit; wherein the first channelized to broadband conversion unit is further configured to communicate the first downlink broadband signal to the first universal remote radio head; wherein the first universal remote radio head is configured to receive the first downlink broadband signal; wherein the first universal remote radio head is further configured to frequency convert the first downlink broadband signal into first downlink radio frequency signals in the first radio frequency band; wherein the first universal remote radio head is further configured to transmit the first downlink radio frequency signals in the first radio frequency band to a first subscriber unit.

Example 2 includes the distributed base station radio system of Example 1, wherein the first channelized radio frequency source is at least one of a Common Public Radio Interface (CPRI) base station interface, an Open Base Station Architecture Initiative (OBSAI) base station interface, and an Open Radio Interface (ORI) interface; and wherein the first downlink channelized data is formatted according to at least one of a Common Public Radio Interface (CPRI) standard, an Open Base Station Architecture Initiative (OBSAI) standard, and an Open Radio Interface (ORI) standard.

Example 3 includes the distributed base station radio system of any of Examples 1-2, wherein the first universal remote radio head is further communicatively coupled to a second channelized to broadband conversion unit configured to receive second downlink channelized data for a second radio frequency band from a second channelized radio frequency source; wherein the second channelized to broadband conversion unit is further configured to convert the second downlink channelized data for the second radio frequency band into a second downlink broadband signal; and wherein the second channelized to broadband conversion unit is further configured to communicate the second downlink broadband signal to the first universal remote radio head.

Example 4 includes the distributed base station radio system of Example 3, further comprising: a switch communicatively coupled between both the first channelized to broadband conversion unit and the second channelized to broadband conversion unit and the first universal remote radio head, the switch configured to receive the first downlink broadband signal from the first channelized to broadband conversion unit and the second downlink broadband signal from the second channelized to broadband conversion unit and to aggregate the first downlink broadband signal with the second downlink broadband signal into an aggregate downlink broadband signal; the switch further configured to transmit the aggregate downlink broadband signal to the first universal remote radio head; the first universal remote radio head further configured to receive the aggregate downlink broadband signal and to frequency convert the aggregate downlink broadband signal into radio frequency signals in both the first radio frequency band and the second radio frequency band; and the first universal remote radio head further configured to transmit the radio frequency signals in both the first radio frequency band and the second radio frequency band to at least one subscriber unit.

Example 5 includes the distributed base station radio system of Example 4, wherein the switch is configured to aggregate the first downlink broadband signal with the second downlink broadband signal through at least one of summing, multiplexing, and combining.

Example 6 includes the distributed base station radio system of any of Examples 4-5, wherein the switch is further configured to transmit the aggregate downlink broadband signal to a second universal remote radio head; wherein the second universal remote radio is configured to receive the aggregate downlink broadband signal and to frequency convert the aggregate downlink broadband signal into radio frequency signals in both the first radio frequency band and the second radio frequency band; and wherein the second universal remote radio head is further configured to transmit the radio frequency signals in the first radio frequency band and the second radio frequency band to at least one subscriber unit.

Example 7 includes the distributed base station radio system of any of Examples 3-6, further comprising: a switch communicatively coupled between both the first channelized to broadband conversion unit and the second channelized to broadband conversion unit and the first universal remote radio head, the switch configured to receive the first downlink broadband signal from the first channelized to broadband conversion unit and the second downlink broadband signal from the second channelized to broadband conversion unit and to aggregate the first downlink broadband signal with the second downlink broadband signal into an aggregate downlink broadband signal; the switch further configured to transmit the aggregate downlink broadband signal to the first universal remote radio head; the first universal remote radio head further configured to receive the aggregate downlink broadband signal, to extract the first downlink broadband signal from the aggregate downlink broadband signal, and to frequency convert the first downlink broadband signal into radio frequency signals in the first radio frequency band; the first universal remote radio head further configured to transmit the first radio frequency signals in the first radio frequency band to at least one subscriber unit.

Example 8 includes the distributed base station radio system of Example 7, wherein the first universal remote radio head is configured to extract the first downlink broadband signal from the aggregate downlink broadband signal through at least one of de-multiplexing and splitting apart.

Example 9 includes the distributed base station radio system of any of Examples 1-8, wherein the first universal remote radio head is further communicatively coupled to a second channelized to broadband conversion unit configured to receive second downlink channelized data for a second radio frequency band from a second channelized radio frequency source; wherein the second channelized to broadband conversion unit is further configured to convert the second downlink channelized data into a second downlink broadband signal; wherein the second channelized to broadband conversion unit is further configured to communicate the second downlink broadband signal to the first universal remote radio head; wherein the first universal remote radio head is further configured to receive the second downlink broadband signal; wherein the first universal remote radio head is further configured to frequency convert the second downlink broadband signal into second downlink radio frequency signals in the second radio frequency band; and wherein the first universal remote radio head is further configured to transmit the second downlink radio frequency signals in the second radio frequency band to at least one subscriber unit.

Example 10 includes the distributed base station radio system of Example 9, wherein the first universal remote radio head includes a first radio frequency converter configured to frequency convert the first downlink broadband signal into the first downlink radio frequency signals in the first radio frequency band; wherein the first universal remote radio head includes a second radio frequency converter configured to frequency convert the second downlink broadband signal into the second downlink radio frequency signals; wherein the first universal remote radio head includes a first power amplifier, radio frequency transceiver, and antenna set configured to transmit the first radio frequency band; and wherein the first universal remote radio head includes a second power amplifier, radio frequency transceiver, and antenna set configured to transmit the second radio frequency band.

Example 11 includes the distributed base station radio system of Example 10, wherein the first downlink radio frequency signals and the second downlink radio frequency signals are MIMO signals transmitted to a single subscriber unit.

Example 12 includes the distributed base station radio system of any of Examples 7-11, wherein the first universal remote radio head includes a first radio frequency converter configured to frequency convert the first downlink broadband signal into the first downlink radio frequency signals in the first radio frequency band; wherein the first universal remote radio head includes a second radio frequency converter configured to frequency convert the second downlink broadband signal into the second downlink radio frequency signals in the second radio frequency band; and wherein the first universal remote radio head includes a single power amplifier, radio frequency transceiver, and antenna set configured to transmit both the first radio frequency band and the second radio frequency band.

Example 13 includes the distributed base station radio system of any of Examples 7-12, wherein the first universal remote radio head includes a single radio frequency converter configured to frequency convert both the first downlink broadband signal into the first downlink radio frequency signals in the first radio frequency band and the second downlink broadband signal into the second downlink radio frequency signals in the second radio frequency band; and wherein the first universal remote radio head includes a single power amplifier, radio frequency transceiver, and antenna set configured to transmit both the first radio frequency band and the second radio frequency band.

Example 14 includes the distributed base station radio system of any of Examples 1-13, further comprising: a second channelized to broadband conversion unit configured to receive second downlink channelized data for a second radio frequency band from a second channelized radio frequency source; wherein the second channelized to broadband conversion unit is further configured to convert the second downlink channelized data into a second downlink broadband signal; a second universal remote radio head communicatively coupled to the second channelized to broadband conversion unit; a switch communicatively coupled between both the first channelized to broadband conversion unit and the second channelized to broadband conversion unit and the first universal remote radio head and the second universal remote radio head; wherein the first channelized to broadband conversion unit is further configured to communicate the first downlink broadband signal to the switch; wherein the second channelized to broadband conversion unit is further configured to communicate the second downlink broadband signal to the switch; wherein the switch is configured to communicate the first downlink broadband signal to the first universal remote radio head; wherein the switch is configured to communicate the second downlink broadband signal to the second universal remote radio head; wherein the second universal remote radio head is configured to receive the second downlink broadband signal; wherein the second universal remote radio head is further configured to frequency convert the second downlink broadband signal into second downlink radio frequency signals in the second radio frequency band; and wherein the second universal remote radio head is further configured to transmit the second downlink radio frequency signals in the second radio frequency band to at least one subscriber unit.

Example 15 includes the distributed base station radio system of any of Examples 1-14, wherein the first channelized radio frequency source is a base band unit of a wireless access base station.

Example 16 includes the distributed base station radio system of any of Examples 1-15, further comprising: wherein the first universal remote radio head is further configured to receive uplink radio frequency signals in the first radio frequency band from the first subscriber unit; wherein the first universal remote radio head is further configured to frequency convert the uplink radio frequency signals in the first radio frequency band into an uplink broadband signal; wherein the first universal remote radio head is further configured to communicate the uplink broadband signal to the first channelized to broadband conversion unit; wherein the first channelized to broadband conversion unit is further configured to receive the uplink broadband signal; wherein the first channelized to broadband conversion unit is further configured to convert the uplink broadband signal into uplink channelized data for the first radio frequency band; and wherein the first channelized to broadband conversion unit is further configured to communicate the uplink channelized data for the first radio frequency band to the first channelized radio frequency source.

Example 17 includes the distributed base station radio system of Example 16, wherein downlink and uplink signals within the first radio frequency band are in distinct spectrum.

Example 18 includes the distributed base station radio system of any of Examples 16-17, wherein downlink and uplink signals within the first radio frequency band overlap in spectrum.

Example 19 includes the distributed base station radio system of any of Examples 16-18, wherein the downlink and uplink signals within the first radio frequency band are separated in time using a Time Division Duplexing (TDD) scheme.

Example 20 includes a method comprising: receiving first downlink channelized data for a first radio frequency band from a first channelized radio frequency source at a first channelized to broadband conversion unit; converting the first downlink channelized data into a first downlink broadband signal at the first channelized to broadband conversion unit; communicating the first downlink broadband signal to a first universal remote radio head from the first channelized to broadband conversion unit; frequency converting the first downlink broadband signal into first downlink radio frequency signals in the first radio frequency band at the first universal remote radio head; and transmitting the first downlink radio frequency signals in the first radio frequency band to a first subscriber unit at the first universal remote radio head.

Example 21 includes the method of Example 20, wherein the first channelized radio frequency source is at least one of a Common Public Radio Interface (CPRI) base station interface, an Open Base Station Architecture Initiative (OBSAI) base station interface, and an Open Radio Interface (ORI) interface; and wherein the first downlink channelized data is formatted according to at least one of a Common Public Radio Interface (CPRI) standard, an Open Base Station Architecture Initiative (OBSAI) standard, and an Open Radio Interface (ORI) standard.

Example 22 includes the method of any of Examples 20-21, further comprising: receiving second downlink channelized data for a second radio frequency band from a second channelized radio frequency source at a second channelized to broadband conversion unit; convert the second downlink channelized data for the second radio frequency band into a second downlink broadband signal at the second channelized to broadband conversion unit; communicating the second downlink broadband signal from the second channelized to broadband conversion unit to the first universal remote radio head; frequency converting the second downlink broadband signal into radio frequency signals in the second radio frequency band; and transmitting the radio frequency signals in the second radio frequency band to at least one subscriber unit at the first universal remote radio head.

Example 23 includes the method of Example 22, further comprising: receiving the first downlink broadband signal from the first channelized to broadband conversion unit at a switch; receiving the second downlink broadband signal from the second channelized to broadband conversion unit at the switch; aggregating the first downlink broadband signal with the second downlink broadband signal into an aggregate downlink broadband signal at the switch; and communicating the aggregate downlink broadband signal from the switch to the first universal remote radio head.

Example 24 includes the method of Example 23, wherein aggregating the first downlink broadband signal with the second downlink broadband signal into an aggregate downlink broadband signal at the switch includes at least one of summing, multiplexing, and combining the first downlink broadband signal with the second downlink broadband signal.

Example 25 includes the method of any of Examples 23-24, further comprising: communicating the aggregate downlink broadband signal from the switch to a second universal remote radio head; converting the aggregate downlink broadband signal into radio frequency signals in both the first radio frequency band and the second radio frequency band at the second universal remote radio head; and transmitting the radio frequency signals in both the first radio frequency band and the second radio frequency band at the second universal remote radio head.

Example 26 includes the method of any of Examples 23-25, further comprising: communicating the aggregate downlink broadband signal from the switch to a second universal remote radio head; extracting the second downlink broadband signals from the aggregate downlink broadband signal; converting the second downlink broadband signal into second downlink radio frequency signals in the second radio frequency band at the second universal remote radio head; and transmitting the second downlink radio frequency signals in the second radio frequency band at the second universal remote radio head.

Example 27 includes the method of Example 26, wherein extracting the second downlink broadband signals from the aggregate downlink broadband signal includes at least one of de-multiplexing and splitting apart.

Example 28 includes the method of any of Examples 22-27, further comprising: receiving the first downlink broadband signal from the first channelized to broadband conversion unit at a switch; receiving the second downlink broadband signal from the second channelized to broadband conversion unit at the switch; aggregating the first downlink broadband signal with the second downlink broadband signals into an aggregate downlink broadband signal at the switch; communicating the aggregate downlink broadband signal from the switch to the first universal remote radio head; frequency converting the aggregate downlink broadband signal into radio frequency signals in both the first radio frequency band and the second radio frequency band; and transmitting the radio frequency signals in both the first radio frequency band and the second radio frequency band to at least one subscriber unit at the first universal remote radio head.

Example 29 includes the method of any of Examples 20-28, further comprising: receiving second downlink channelized data for a second radio frequency band from a second channelized radio frequency source at a second channelized to broadband conversion unit; converting the second downlink channelized data into a second downlink broadband signal; communicating the second downlink broadband signal to the first universal remote radio head from the second channelized to broadband conversion unit; frequency converting the second downlink broadband signal into second downlink radio frequency signals in the second radio frequency band at the first universal remote radio head; and transmitting the second downlink radio frequency signals in the second radio frequency band to at least one subscriber unit.

Example 30 includes the method of Example 29, wherein frequency converting the first downlink broadband signal into first downlink radio frequency signals in the first radio frequency band occurs at a first frequency converter of the first universal remote radio head; wherein frequency converting the second downlink broadband signal into second downlink radio frequency signals in the second radio frequency band occurs at a second frequency converter of the first universal remote radio head; wherein transmitting the first downlink radio frequency signals in the first radio frequency band to a first subscriber unit at the first universal remote radio head occurs at a first power amplifier, radio frequency transceiver, and antenna set of the first universal remote radio head; and wherein transmitting the second downlink radio frequency signals in the second radio frequency band to a second subscriber unit at the first universal remote radio head occurs at a second power amplifier, radio frequency transceiver, and antenna set of the first universal remote radio head.

Example 31 includes the method of Example 30, wherein the first downlink radio frequency signals and the second downlink radio frequency signals are MIMO signals transmitted to a single subscriber unit.

Example 32 includes the method of any of Examples 29-31, wherein frequency converting the first downlink broadband signal into first downlink radio frequency signals in the first radio frequency band occurs at a first frequency converter of the first universal remote radio head; wherein frequency converting the second downlink broadband signal into second downlink radio frequency signals in the second radio frequency band occurs at a second frequency converter of the first universal remote radio head; and wherein transmitting both the first downlink radio frequency signals in the first radio frequency band and the second downlink radio frequency signals in the second radio frequency band occurs at a single power amplifier, radio frequency transceiver, and antenna set.

Example 33 includes the method of any of Examples 29-32, wherein frequency converting both the first downlink broadband signal into the first downlink radio frequency signals in the first radio frequency band and the second downlink broadband signals into the second downlink radio frequency signals in the second radio frequency band occurs at a single radio frequency converter; and wherein transmitting both the first downlink radio frequency signals in the first radio frequency band and the second downlink radio frequency signals in the second radio frequency band occurs at a single power amplifier, radio frequency transceiver, and antenna set.

Example 34 includes the method of any of Examples 20-33, further comprising: communicating the first downlink broadband signal from the first channelized to broadband conversion unit to a switch; receiving second downlink channelized data for a second radio frequency band from a second channelized radio frequency source at a second channelized to broadband conversion unit; converting the second downlink channelized data into a second downlink broadband signal at the second channelized to broadband conversion unit; communicating the second downlink broadband signal from the second channelized to broadband conversion unit to the switch; communicating the first downlink broadband signal from the switch to the first universal remote radio head; communicating the second downlink broadband signal from the switch to the second universal remote radio head; frequency converting the second downlink broadband signal into second downlink radio frequency signals in the second radio frequency band at the second universal remote radio head; and transmitting the second downlink radio frequency signals in the second radio frequency band to at least one subscriber unit at the second universal remote radio head.

Example 35 includes the method of any of Examples 20-34, further comprising: receiving uplink radio frequency signals in the first radio frequency band from the first subscriber unit at the first universal remote radio head; frequency converting the uplink radio frequency signals in the first radio frequency band into an uplink broadband signal at the first universal remote radio head; communicating the uplink broadband signal to the first channelized to broadband conversion unit from the first universal remote radio head; converting the uplink broadband signal into uplink channelized data for the first radio frequency band at the first channelized to broadband conversion unit; and communicating the uplink channelized data for the first radio frequency band to the first channelized radio frequency source at the first channelized to broadband conversion unit.

Example 36 includes the method of Example 35, wherein downlink and uplink signals within the first radio frequency band are in distinct spectrum.

Example 37 includes the method of any of Examples 35-36, wherein downlink and uplink signals within the first radio frequency band overlap in spectrum.

Example 38 includes the method of any of Examples 35-37, wherein the downlink and uplink signals within the first radio frequency band are separated in time using a Time Division Duplexing (TDD) scheme.

Example 39 includes a universal remote radio head comprising: an interface configured to receive a downlink broadband signal including digitized data for a radio frequency band from a remote channelized to broadband conversion module; a frequency converter configured to frequency convert the downlink broadband signal into downlink radio frequency signals in the radio frequency band; a radio frequency transceiver and antenna pair configured to transmit the downlink radio frequency signals in the radio frequency band to a first subscriber unit; the radio frequency transceiver and antenna pair further configured to receive uplink radio frequency signals in the radio frequency band from the first subscriber unit; the frequency converter further configured to frequency convert the uplink radio frequency signals in the radio frequency band into an uplink broadband signal; and wherein the interface is configured to communicate the uplink broadband signal including digitized data for the radio frequency band to the remote channelized to broadband conversion module.

Example 40 includes a method comprising: receiving a downlink broadband signal including digitized data from a radio frequency band communicated from a remote channelized to broadband conversion module at a universal remote radio head; frequency converting the downlink broadband signal into downlink radio frequency signals in the radio frequency band at the universal remote radio head; transmitting the downlink radio frequency signals in the radio frequency band to a first subscriber unit; receiving uplink radio frequency signals in the radio frequency band from the first subscriber unit; frequency converting the uplink radio frequency signals in the radio frequency band into an uplink broadband signal; and communicating the uplink broadband signal to the remote channelized to broadband conversion module at the universal remote radio head.

Example 41 includes a channelized to broadband conversion unit comprising: a first interface configured to receive first downlink channelized data for a radio frequency band from a channelized radio frequency source coupled to the channelized to broadband conversion unit; a converter configured to convert the first downlink channelized data into a downlink broadband signal; a second interface configured to communicate the downlink broadband signal to a universal remote radio head; wherein the second interface is further configured to receive an uplink broadband signal from the universal remote radio head; wherein the converter is further configured to convert the uplink broadband signal from the universal remote radio head into uplink channelized data for the radio frequency band; and wherein the first interface is further configured to communicate uplink channelized data for the radio frequency band to the channelized radio frequency source coupled to the channelized to broadband conversion unit.

Example 42 includes the channelized to broadband conversion unit of Example 41, wherein the channelized radio frequency source is at least one of a Common Public Radio Interface (CPRI) base station interface, an Open Base Station Architecture Initiative (OBSAI) base station interface, and an Open Radio Interface (ORI) interface; and wherein the first downlink channelized data and the uplink channelized data are formatted according to at least one of a Common Public Radio Interface (CPRI) standard, an Open Base Station Architecture Initiative (OBSAI) standard, and an Open Radio Interface (ORI) standard.

Example 43 includes a method comprising: receiving downlink channelized data for a radio frequency band from an channelized radio frequency source at a channelized to broadband conversion unit; converting the downlink channelized data into a downlink broadband signal at the channelized to broadband conversion unit; communicating the downlink broadband signal to a universal remote radio head; receiving an uplink broadband signal from the universal remote radio head; converting the uplink broadband signal into uplink channelized data for the radio frequency band at the channelized to broadband conversion unit; and communicating the uplink channelized data for the radio frequency band to the channelized radio frequency source coupled to the channelized to broadband conversion unit.

Example 44 includes the method of Example 43, wherein the channelized radio frequency source is at least one of a Common Public Radio Interface (CPRI) base station interface, an Open Base Station Architecture Initiative (OBSAI) base station interface, and an Open Radio Interface (ORI) interface; and wherein the downlink channelized data and the uplink channelized data are formatted according to at least one of a Common Public Radio Interface (CPRI) standard, an Open Base Station Architecture Initiative (OBSAI) standard, and an Open Radio Interface (ORI) standard.

What is claimed is:

1. A distributed base station radio system comprising:
   a first radio head configured to:
      communicate first analog radio frequency signals in a first radio frequency band with a first subscriber unit;
      convert between the first analog radio frequency signals in the first radio frequency band and a first digital broadband signal through at least one of frequency conversion and analog to digital conversion;
   a first broadband to channelized conversion unit communicatively coupled to the first radio head and configured to communicate the first digital broadband signal with the first broadband to channelized conversion unit;
   wherein the first broadband to channelized conversion unit is further configured to:
      communicate the first digital broadband signal;
      convert between the first digital broadband signal and first digital channelized data for the first radio frequency band; and
      communicate the first digital channelized data for the first radio frequency band with a first channelized radio frequency interface.

2. The distributed base station radio system of claim 1, wherein the first channelized radio frequency interface is at least one of a Common Public Radio Interface (CPRI) base station interface, an Open Base Station Architecture Initiative (OBSAI) base station interface, and an Open Radio Interface (ORI) interface; and
   wherein the first digital channelized data is formatted according to at least one of a Common Public Radio Interface (CPRI) standard, an Open Base Station Architecture Initiative (OBSAI) standard, and an Open Radio Interface (ORI) standard.

3. The distributed base station radio system of claim 1, wherein the first radio head is further communicatively coupled to a second broadband to channelized conversion unit;
   wherein the first radio head is further configured to communicate a second broadband signal for a second radio frequency band with the second broadband to channelized conversion unit;
   wherein the second broadband to channelized conversion unit is further configured to communicate the second broadband signal with the first radio head;
   wherein the second broadband to channelized conversion unit is further configured to convert between the second broadband signal for the second radio frequency band and second digital channelized data; and
   wherein the second broadband to channelized conversion unit is further configured to communicate the second digital channelized data for the second radio frequency band with a second channelized radio frequency interface.

4. The distributed base station radio system of claim 3, further comprising:
   a switch communicatively coupled between both the first broadband to channelized conversion unit and the second broadband to channelized conversion unit and the first radio head;
   the switch configured to communicate an aggregate broadband signal of the first radio head and to separate the first broadband signal and the second broadband signal of the aggregate broadband signal; and
   the switch further configured to communicate the first broadband signal with the first broadband to channelized conversion unit and the second broadband signal with the second broadband to channelized conversion unit.

5. The distributed base station radio system of claim 3, further comprising:
   a switch communicatively coupled between both the first broadband to channelized conversion unit and the second broadband to channelized conversion unit and the first radio head;
   the first radio head further configured to communicate the first radio frequency signals in the first radio frequency band with at least one subscriber unit;
   the first radio head further configured to frequency convert between the first radio frequency signals in the first radio frequency band and a first digital broadband signal;
   the first radio head further configured to combine the first digital broadband signal with another digital broadband signal into the aggregate digital broadband signal; and
   the first radio head further configured to communicate the aggregate digital broadband signal with the switch.

6. The distributed base station radio system of claim 5, wherein the first radio head is configured to combine the first digital broadband signal with another digital broadband signal into the aggregate digital broadband signal through at least one of de-multiplexing and splitting apart.

7. The distributed base station radio system of claim 5, wherein the first universal remote antenna includes a single radio frequency transceiver and antenna set configured to communicate both the first radio frequency band and the second radio frequency band; and
   wherein the first radio head includes a single radio frequency converter configured to frequency convert between both the first analog radio frequency signals in the first radio frequency band and the first digital broadband signal and the second analog radio frequency signals in the second radio frequency band and the second digital broadband signal.

8. The distributed base station radio system of claim 1, wherein the first channelized radio frequency device is a base band unit of a wireless access base station.

9. A channelized to broadband conversion unit comprising:
circuitry configured to:
communicate first digital channelized data for a radio frequency band with a first channelized radio frequency device coupled to the channelized to broadband conversion unit, wherein the first digital channelized data is specific to a first channel;
convert between the first digital channelized data and a first digital broadband signal representing a portion of radio frequency spectrum having a plurality of channels in non-overlapping locations that represent the location of each of the plurality of channels within the portion of radio frequency spectrum; and
communicate the digital broadband signal with a remotely located radio head.

10. The channelized to broadband conversion unit of claim 9, wherein the first channelized radio frequency device is at least one of a Common Public Radio Interface (CPRI) base station interface, an Open Base Station Architecture Initiative (OBSAI) base station interface, and an Open Radio Interface (ORI) interface; and
wherein the first digital channelized data is formatted according to at least one of a Common Public Radio Interface (CPRI) standard, an Open Base Station Architecture Initiative (OBSAI) standard, and an Open Radio Interface (ORI) standard.

11. The channelized to broadband conversion unit of claim 9, wherein the first channelized radio frequency device is a base band unit of a wireless access base station.

12. A radio head comprising:
circuitry configured to:
communicate a digital broadband signal representing a portion of radio frequency spectrum in a radio frequency band having a plurality of channels in non-overlapping locations that represent the location of each of the plurality of channels within the portion of radio frequency spectrum;
convert between the digital broadband signal and analog radio frequency signals in the radio frequency band; and
communicate the analog radio frequency signals in the radio frequency band to a first subscriber unit.

13. The radio head of claim 12, wherein the first radio head is further communicatively coupled to a second channelized to broadband conversion unit; and
wherein the first radio head is further configured to communicate a second broadband signal for a second radio frequency band with the second broadband to channelized conversion unit.

14. The radio head of claim 12, further configured to communicate a second digital broadband signal representing a second portion of radio frequency spectrum in a second radio frequency band having a second plurality of channels in non-overlapping locations that represent the location of each of the second plurality of channels within the second portion of radio frequency spectrum.

15. A broadband to channelized conversion unit comprising:
circuitry configured to:
communicate a first digital broadband signal with a first radio head, wherein the first digital broadband signal represents a portion of radio frequency spectrum having a plurality of channels in non-overlapping locations that represent the location of each of the plurality of channels within the portion of radio frequency spectrum;
convert between the digital broadband signal of the radio head and first digital channelized data for the radio frequency band, wherein the channelized data is specific to a first channel; and
communicate the first digital channelized data for the radio frequency band to a first channelized radio frequency interface coupled to the broadband to channelized conversion unit.

16. The broadband to channelized conversion unit of claim 15, wherein the first channelized radio frequency interface is at least one of a Common Public Radio Interface (CPRI) base station interface, an Open Base Station Architecture Initiative (OBSAI) base station interface, and an Open Radio Interface (ORI) interface; and
wherein the first digital channelized data is formatted according to at least one of a Common Public Radio Interface (CPRI) standard, an Open Base Station Architecture Initiative (OBSAI) standard, and an Open Radio Interface (ORI) standard.

17. The broadband to channelized conversion unit of claim 15, wherein the first channelized radio frequency interface is a base band unit of a wireless access base station.

18. A radio head comprising:
circuitry configured to:
communicate analog radio frequency signals in the radio frequency band with a first subscriber unit;
convert between the analog radio frequency signals in the radio frequency band and a digital broadband signal representing a portion of radio frequency spectrum in a radio frequency band having a plurality of channels in non-overlapping locations that represent the location of each of the plurality of channels within the portion of radio frequency spectrum; and
communicate the digital broadband signal with a remote channelized to broadband conversion unit.

19. The radio head of claim 18, wherein the first radio head is further communicatively coupled to a second broadband to channelized conversion unit; and
wherein the first radio head is further configured to communicate a second broadband signal for a second radio frequency band to the second broadband to channelized conversion unit.

20. The radio head of claim 18, further configured to communicate a second digital broadband signal representing a second portion of radio frequency spectrum in a second radio frequency band having a second plurality of channels in non-overlapping locations that represent the location of each of the second plurality of channels within the second portion of radio frequency spectrum.

* * * * *